(12) United States Patent
Jordan et al.

(10) Patent No.: US 12,458,918 B2
(45) Date of Patent: Nov. 4, 2025

(54) PROCESS AND APPARATUS FOR TREATING METHANE-CONTAINING GAS

(71) Applicant: KANADEVIA INOVA AG, Zürich (CH)

(72) Inventors: Uwe Jordan, Zeven (DE); Gamuret Hack, Zürich (CH); Mojtaba Mirdrikvand, Zeven (DE)

(73) Assignee: KANADEVIA INOVA AG, Zurich (CH)

( * ) Notice: Subject to any disclaimer, the term of this patent is extended or adjusted under 35 U.S.C. 154(b) by 0 days.

(21) Appl. No.: 18/872,679

(22) PCT Filed: Jun. 6, 2023

(86) PCT No.: PCT/EP2023/065153
§ 371 (c)(1),
(2) Date: Dec. 6, 2024

(87) PCT Pub. No.: WO2023/237568
PCT Pub. Date: Dec. 14, 2023

(65) Prior Publication Data
US 2025/0262588 A1     Aug. 21, 2025

(30) Foreign Application Priority Data

Jun. 8, 2022  (EP) .................... 22177910

(51) Int. Cl.
*B01D 53/14* (2006.01)
*B01D 53/22* (2006.01)
*C10L 3/10* (2006.01)

(52) U.S. Cl.
CPC ..... *B01D 53/1425* (2013.01); *B01D 53/1487* (2013.01); *B01D 53/1493* (2013.01);
(Continued)

(58) Field of Classification Search
None
See application file for complete search history.

(56) References Cited

U.S. PATENT DOCUMENTS

| | | |
|---|---|---|
| 8,840,708 B1 | 9/2014 | Morrow et al. |
| 2012/0103185 A1 * | 5/2012 | Vaidya ................. B01D 53/229 95/45 |
| 2019/0001263 A1 | 1/2019 | Prince et al. |

FOREIGN PATENT DOCUMENTS

| | | | |
|---|---|---|---|
| EP | 3628390 A1 * | 4/2020 | ............ C12M 21/04 |
| WO | WO-2017099581 A2 * | 6/2017 | ......... B01D 53/1425 |

OTHER PUBLICATIONS

Dec. 19, 2024 International Preliminary Report on Patentability issued in Internatonal Application PCT/EP2023/065153.
(Continued)

*Primary Examiner* — Gabriel E Gitman
(74) *Attorney, Agent, or Firm* — Oliff PLC

(57) ABSTRACT

A process for treating methane-containing gas including $CO_2$ and at least one compound of volatile organic compounds (VOC) wherein the methane-containing gas mixture is compressed, cooled and supplied to an absorption apparatus absorbing liquid VOC reversibly and at least a portion of the VOC is absorbed from the methane-containing gas mixture yielding a methane-containing and VOC- and $CO_2$-reduced gas mixture and VOC- and $CO_2$-loaded absorption means. The VOC- and $CO_2$-loaded absorption means is transported from the absorption apparatus to a desorption apparatus. The methane-containing and VOC-reduced gas mixture is supplied from the absorption apparatus to a separation apparatus for $CO_2$ removal. A regeneration gas stream includes at least a portion of the $CO_2$-enriched gas stream which regenerates the VOC- and $CO_2$-loaded absorption means. The exhaust gas stream discharges from the desorption apparatus and the at least partially regenerated
(Continued)

Figure 1:
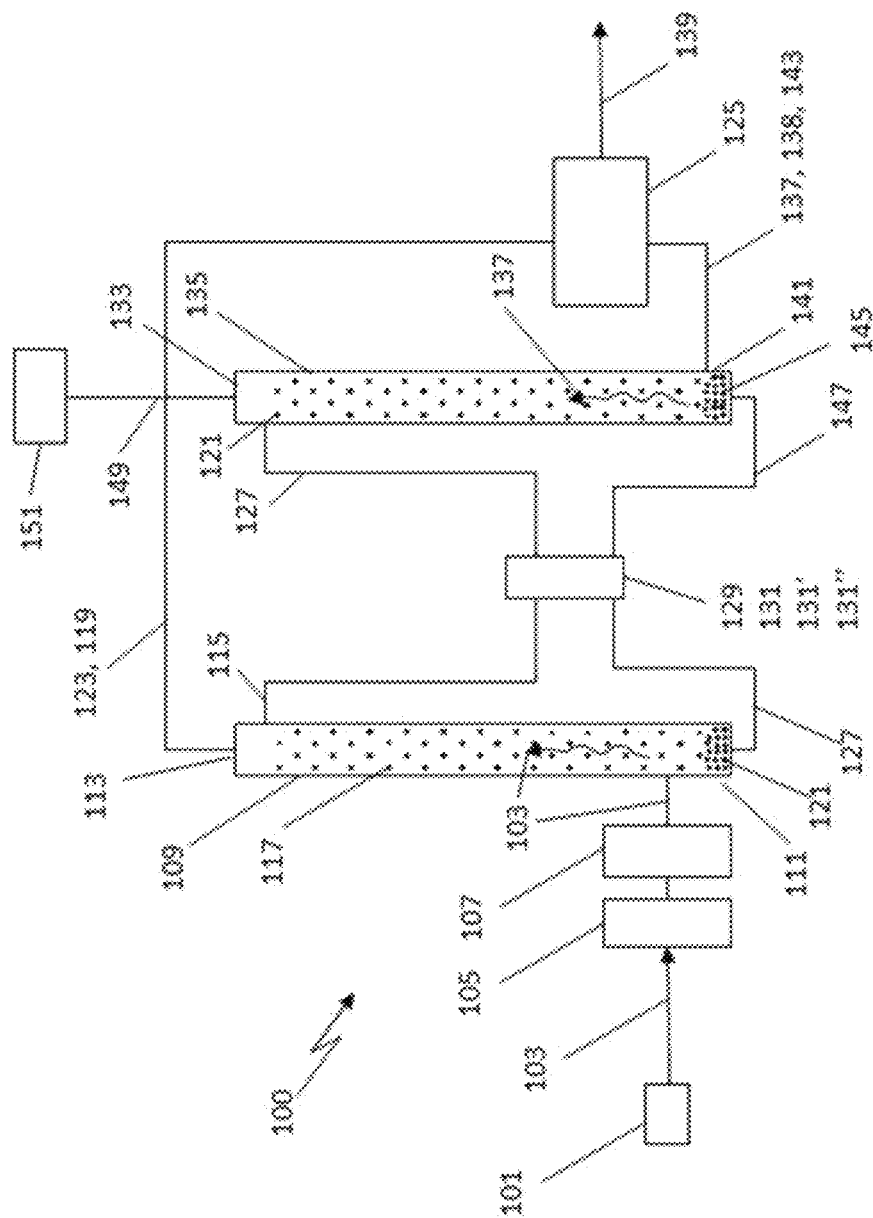

absorption means moves from the desorption apparatus into the absorption apparatus.

14 Claims, 11 Drawing Sheets

(52) U.S. Cl.
CPC .............. *B01D 53/22* (2013.01); *C10L 3/101* (2013.01); *B01D 2252/2028* (2013.01); *B01D 2256/245* (2013.01); *B01D 2257/306* (2013.01); *B01D 2257/702* (2013.01); *B01D 2257/708* (2013.01); *B01D 2258/05* (2013.01)

(56) References Cited

OTHER PUBLICATIONS

Oct. 10, 2023 Search Report issued in International Patent Application No. PCT/EP2023/065153.

Oct. 10, 2023 Written Opinion of the International Searching Authority issued in International Patent Application No. PCT/EP2023/065153.

\* cited by examiner

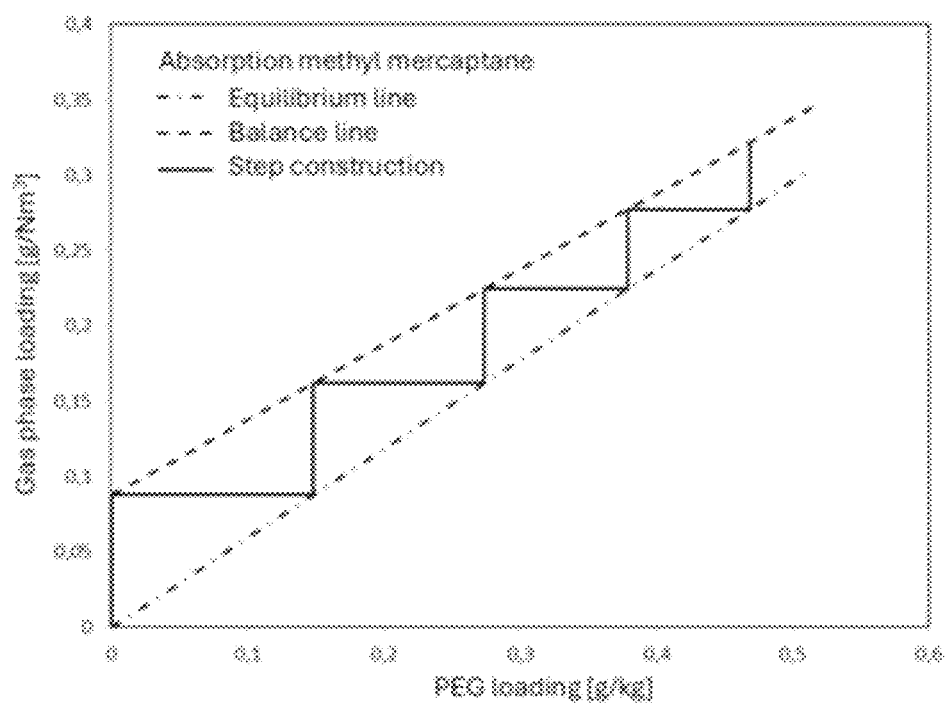
Figur 3a
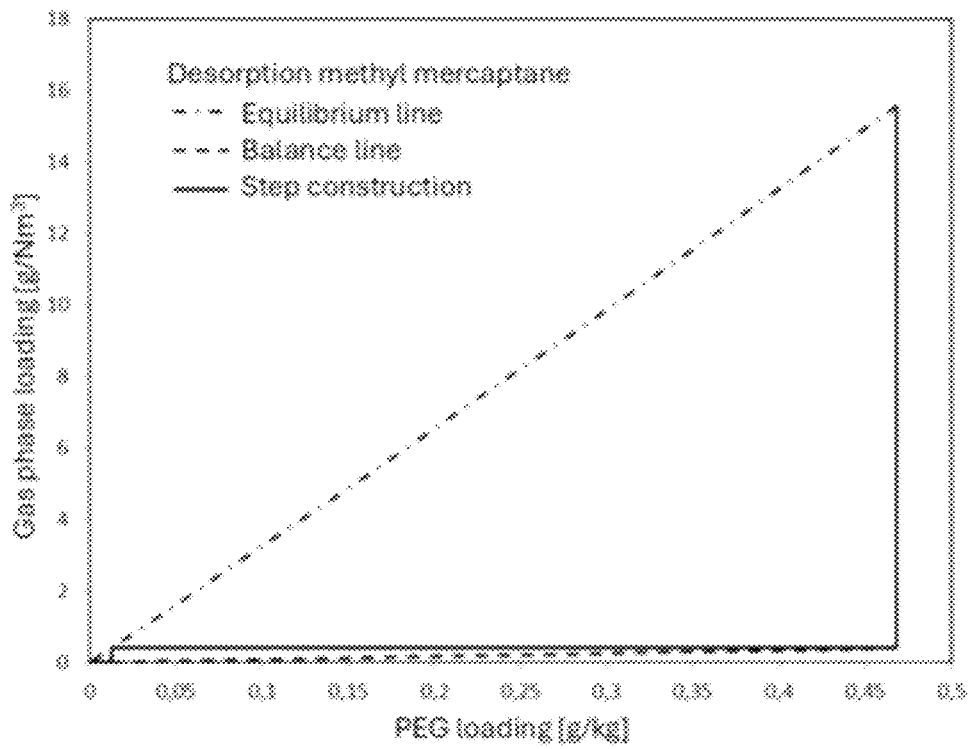
Figur 3b

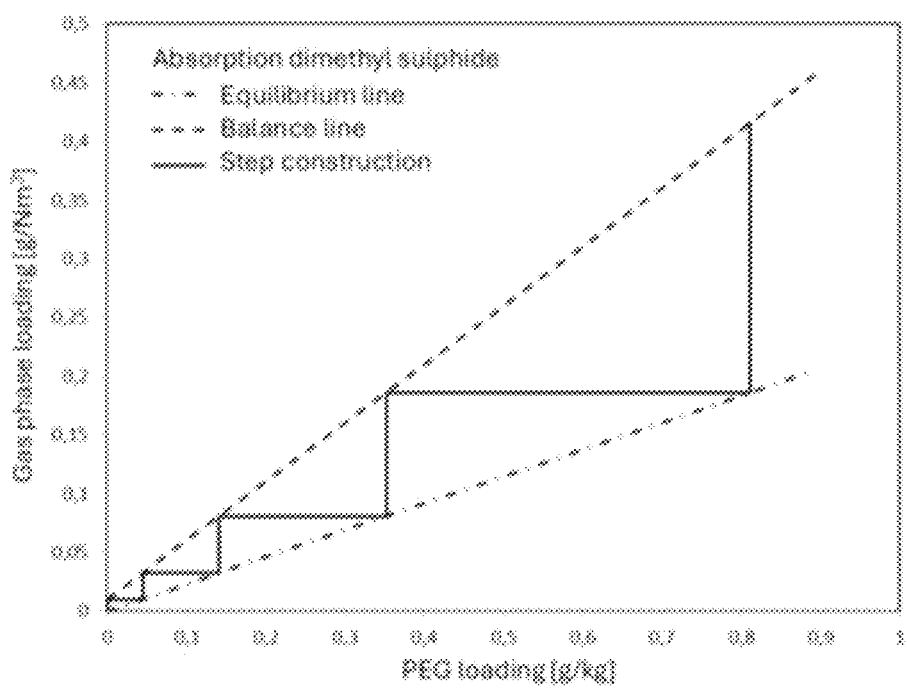
Figur 4a
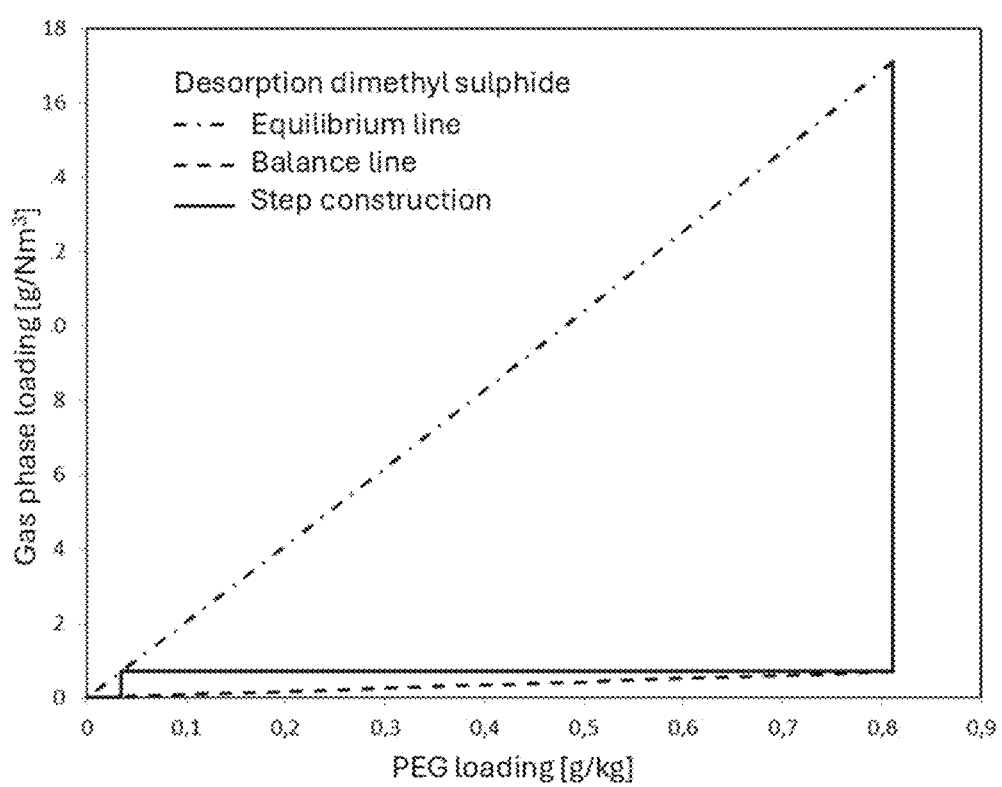
Figur 4b

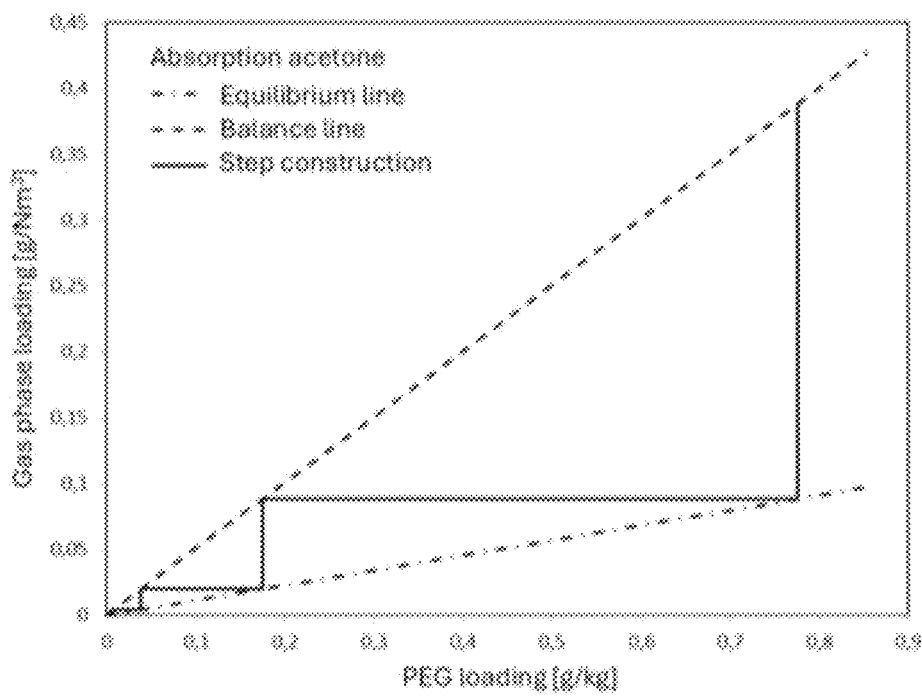
Figur 5a
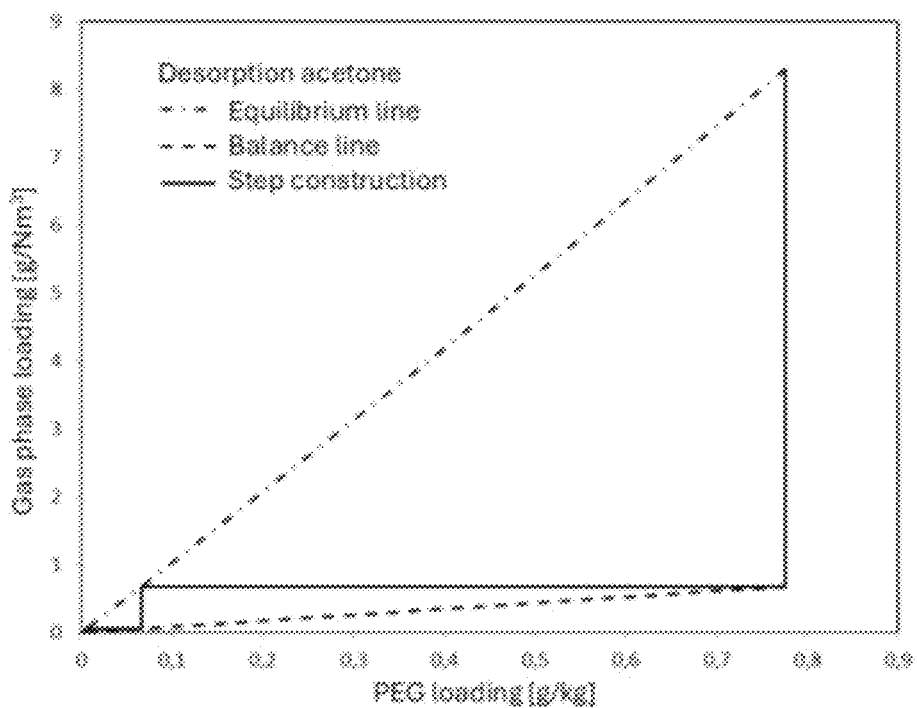
Figur 5b

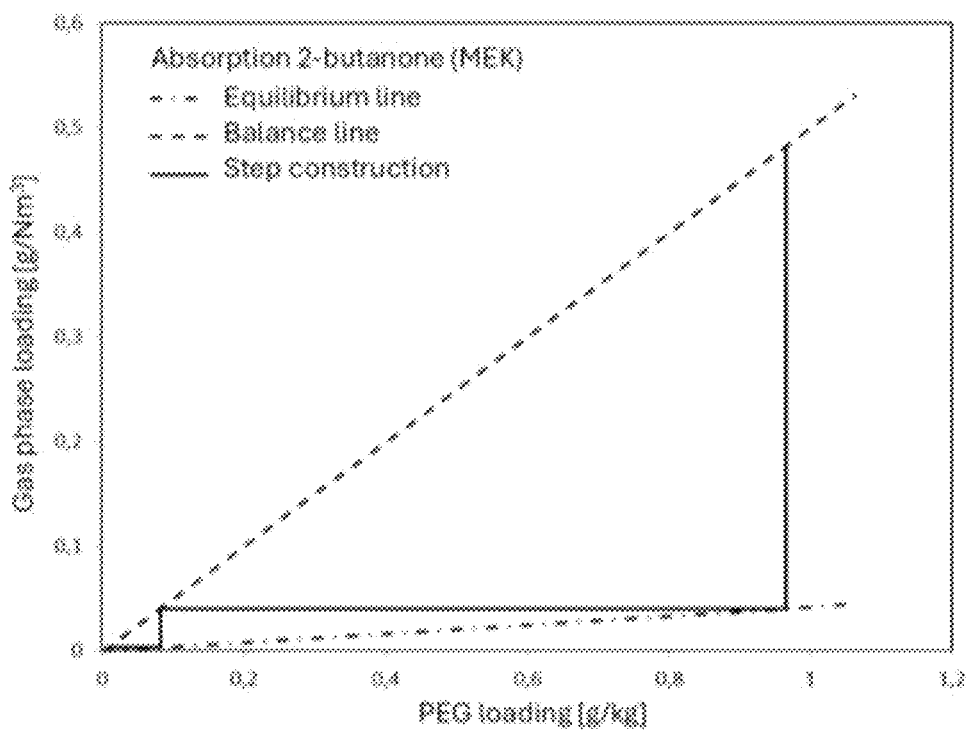
Figur 6a
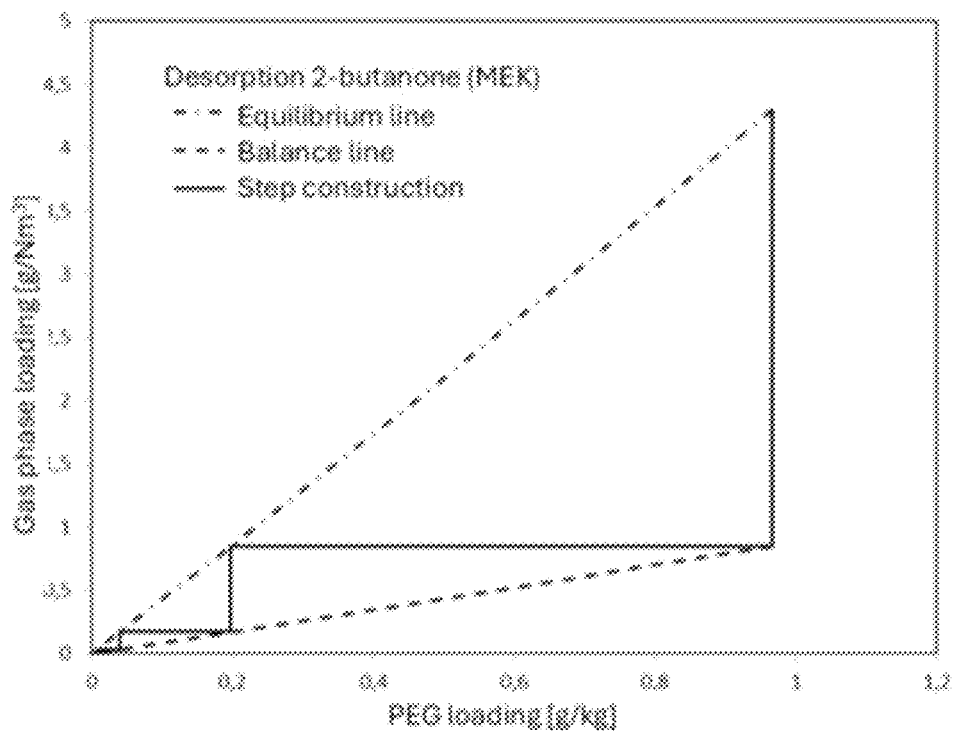
Figur 6b

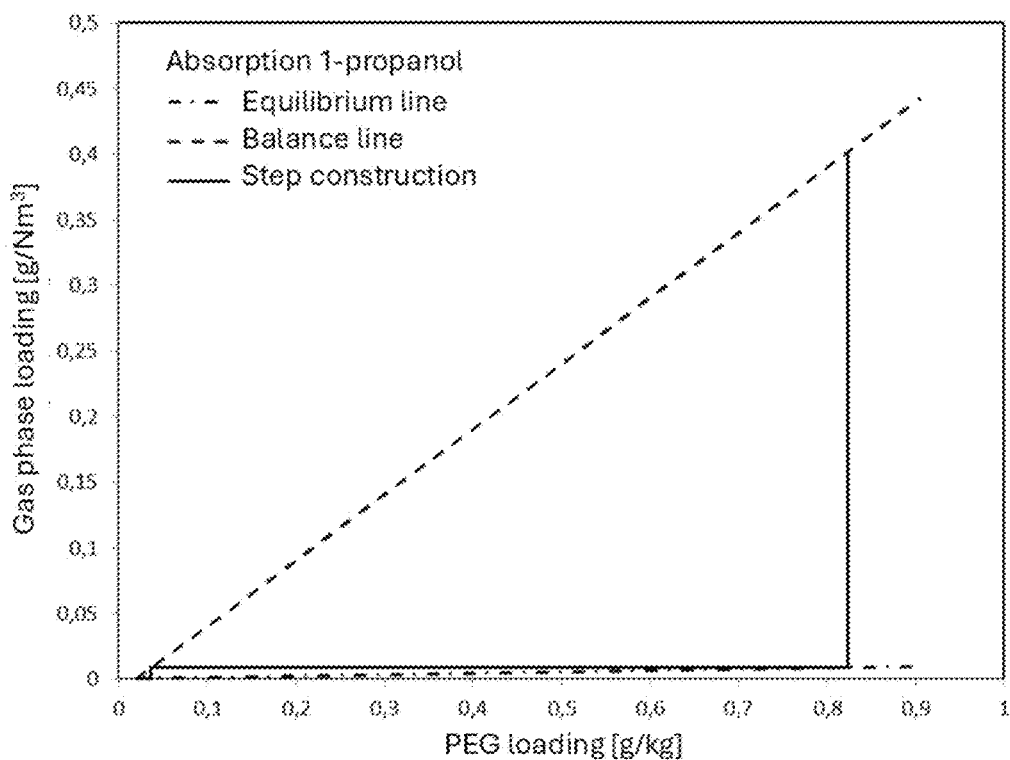
Figur 7a
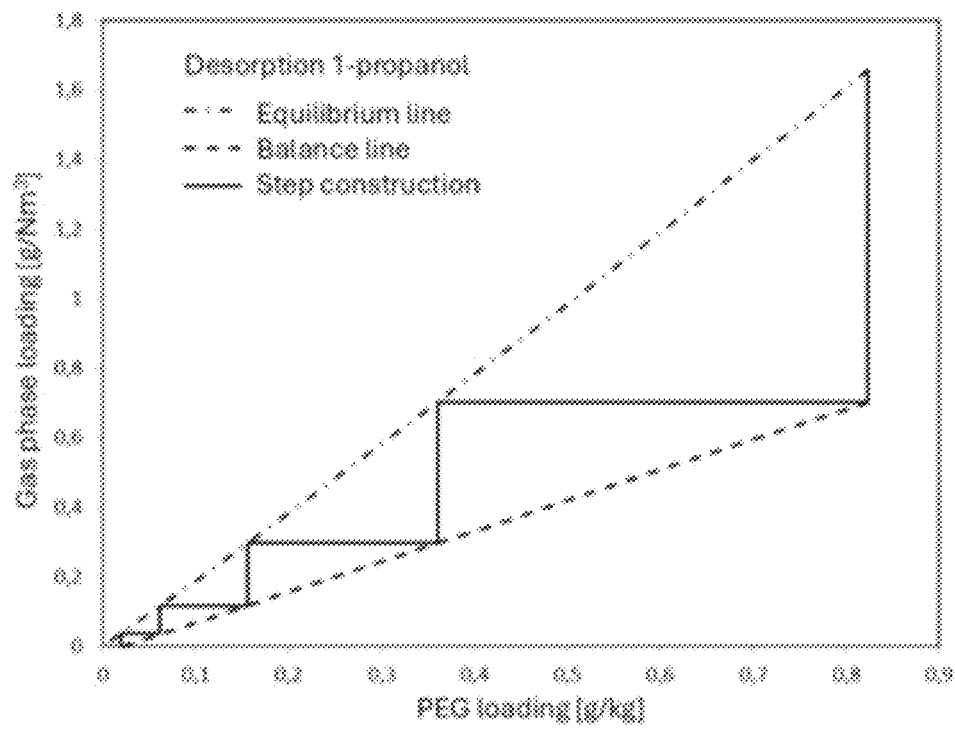
Figur 7b

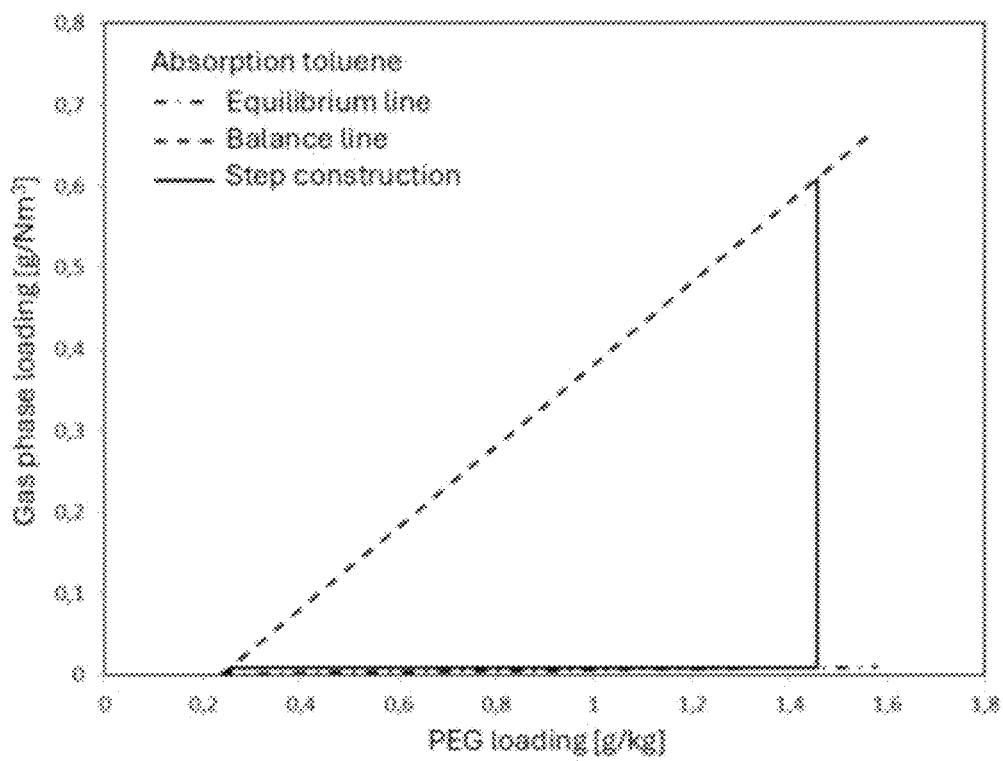
Figur 8a
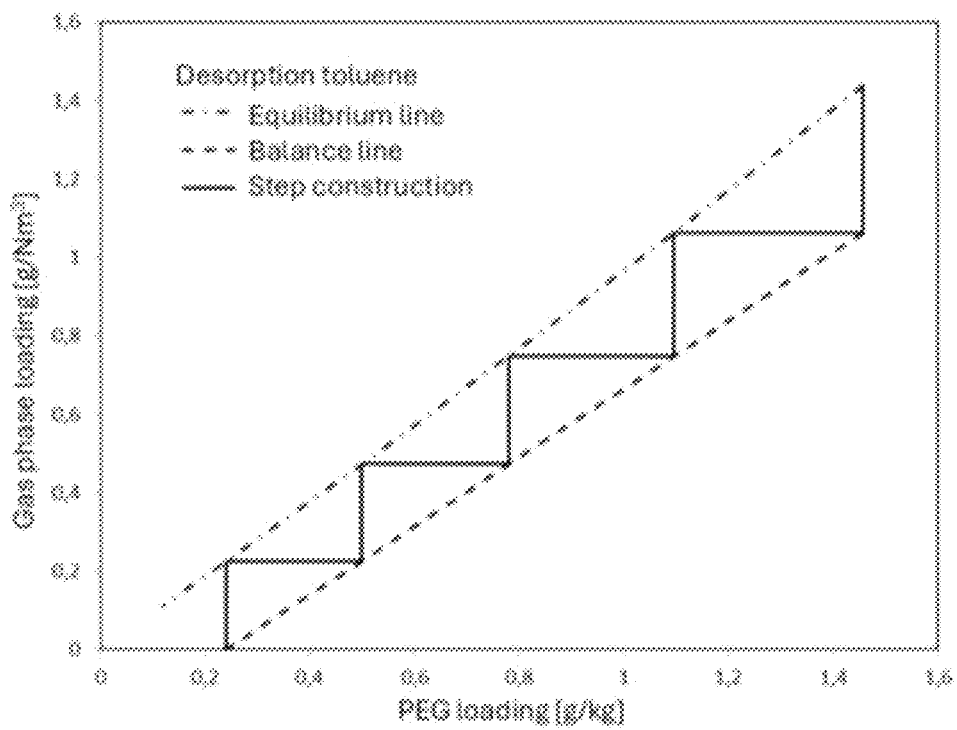
Figur 8b

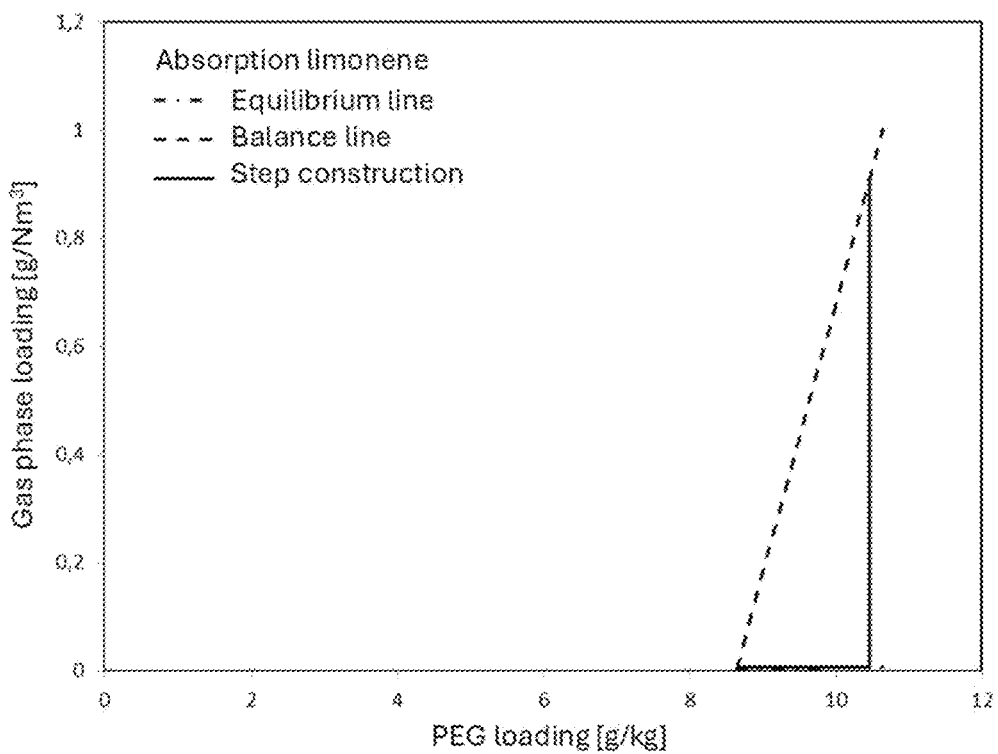
Figur 9a
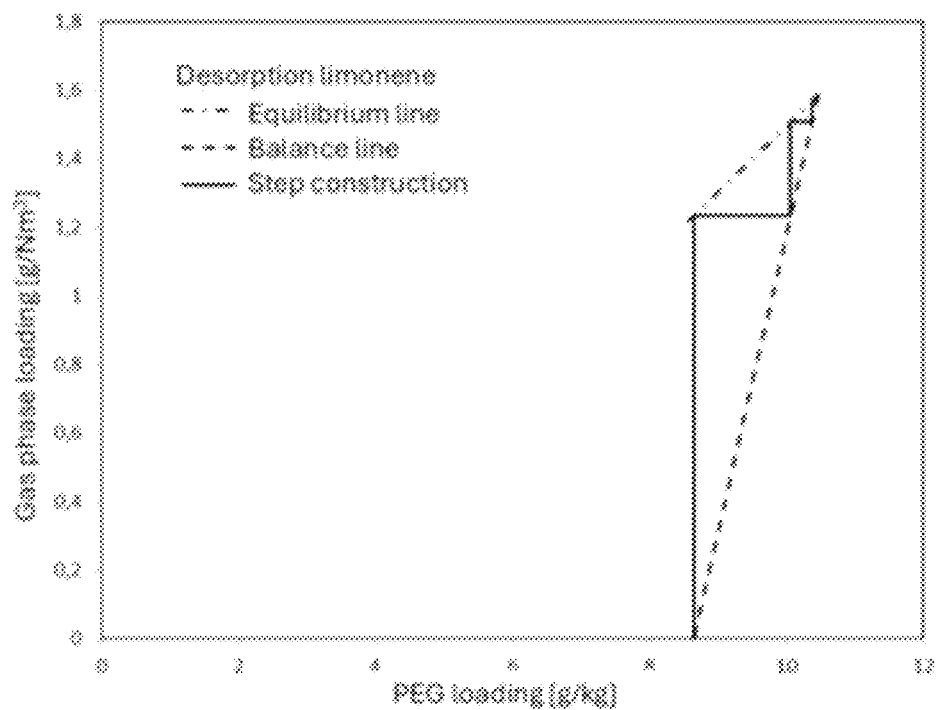
Figur 9b

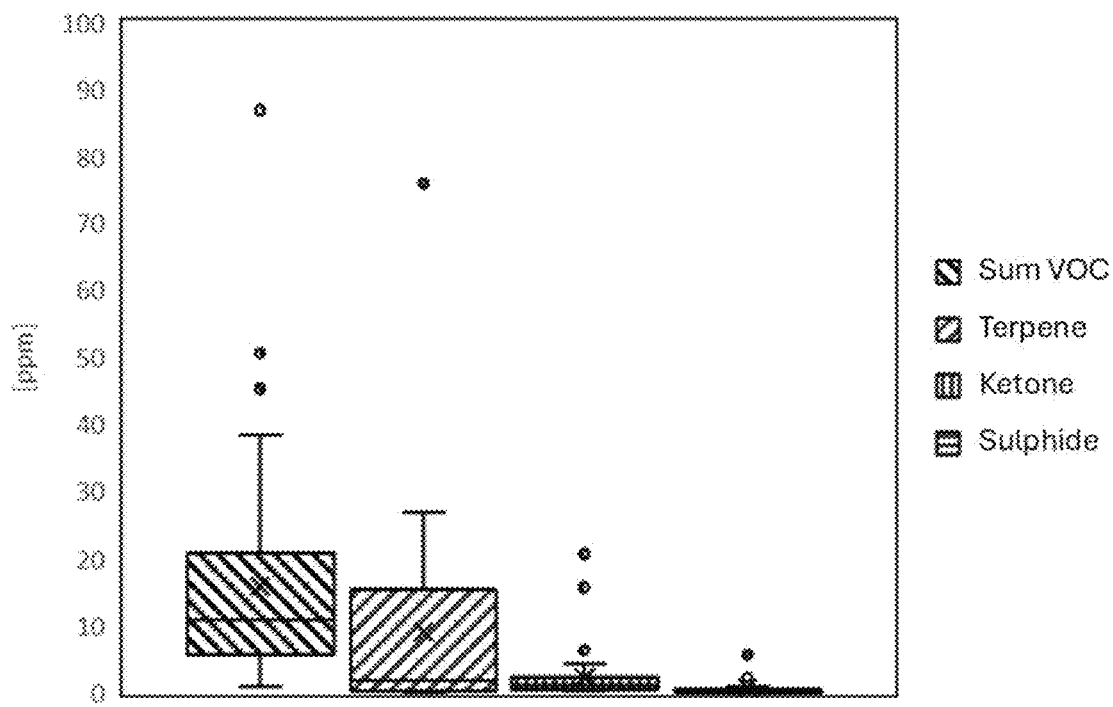
Figur 10
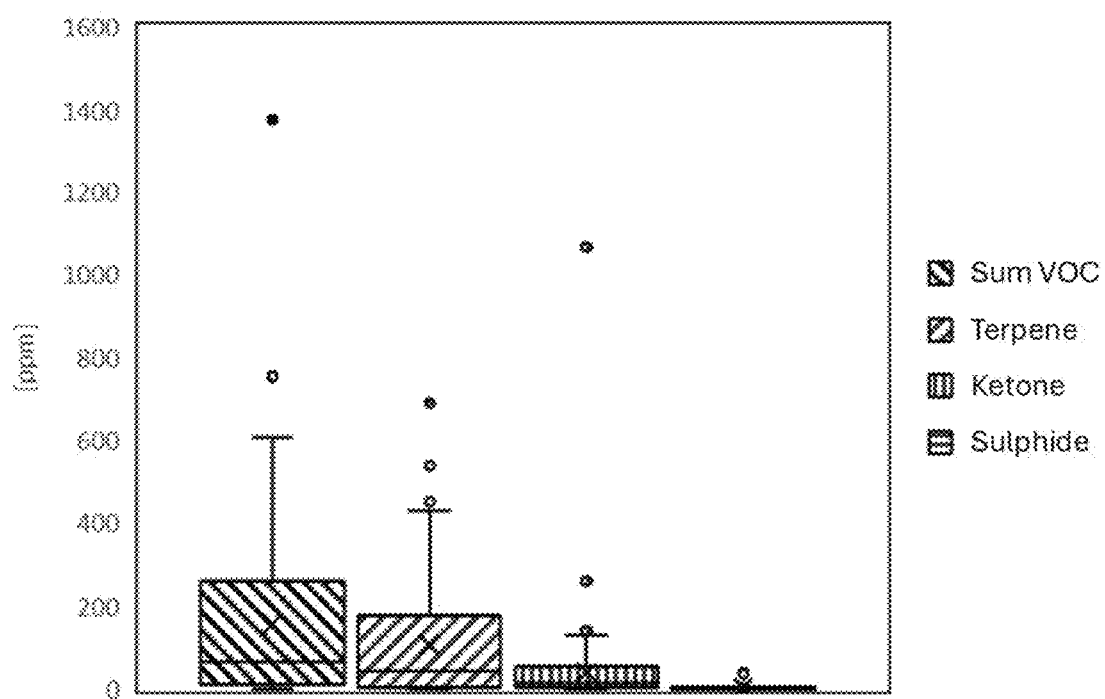
Figur 11

PROCESS AND APPARATUS FOR TREATING METHANE-CONTAINING GAS

The present invention relates to a method of processing methane-containing gas as claimed in claim 1 and to an apparatus for performance of said method.

In view of progressive global warming, $CO_2$-neutral energy carriers are becoming ever more important for modern society. A proven method of obtaining such a $CO_2$-neutral energy carrier is the fermentation of food wastes in fermenters for production of biogas. Since foods such as fruit or vegetables bind $CO_2$ from the atmosphere as they grow, the biogas formed in the fermentation of these foods and the methane present therein are $CO_2$- or climate-neutral. Biogas in the present application means a methane-containing gas mixture of natural origin. As well as biogas produced by fermentation, for instance from fermenters or landfill sites, biogas may also be of non-fermentative origin, for example in the form of natural gas, pit gas or coal seam gas.

In order to render such methane-containing gas mixtures or biogases usable for energy generation, the methane concentration in the gas mixture must be increased by removing or at least reducing the level of substantially all other compounds (called impurities). For that reason, biogas produced by fermentation in particular is usually cleaned to increase the methane content.

For the cleaning of gas mixtures, the use of suitable adsorbers is common knowledge, for instance in industrial offgas cleaning or else in domestic ventilation, for example in extractor hoods. By adsorption on the inner surface of porous adsorber materials, air pollutants, especially hydrocarbons, are removed from the gas mixture to be cleaned. A distinction may be made between fixed bed adsorbers, moving bed adsorbers, rotor adsorbers, fluidized bed adsorbers and entrained flow adsorbers. In multistage offgas cleaning systems, adsorbers are often also used as the final cleaning stage, as "policing filters".

It is nowadays possible to separate off impurities in biogases by various biological, chemical and physical processes, which is generally referred to as "(bio)gas processing" and constitutes an important field of use of gas cleaning. Compounds having a high boiling point can be separated off, for instance, by adsorption, for example on an activated carbon filter, whereas compounds having a low boiling point can be removed by condensation for example, and water-soluble compounds by means of a scrubber. Impurities typically present in the biogas are, for example, carbon dioxide ($CO_2$), hydrogen sulfide ($H_2S$), ammonia ($NH_3$) and volatile organic compounds (VOCs for short).

VOCs is a collective term for organic—i.e. carbonaceous—substances that are transferred to the gas phase at room temperature or higher temperatures by evaporation, i.e. are volatile. Examples of VOCs are terpenes, ketones, amines, aldehydes, sulfur-containing hydrocarbons (S-HCs) and others. Methane ($CH_4$) is not a constituent of the group of the VOCs in the context of the present application.

In offgas cleaning, the removal of VOCs is becoming ever more important, since the reduction of VOC emissions in the field of industry and commerce is important for two reasons: firstly from a health point of view, since VOCs in the ambient air can cause particular symptoms in humans such as headaches, oversensitivity reactions, tiredness, reduced physical capacity, sleep disorders and irritated respiratory pathways, which are also referred to collectively by the term "sick building syndrome". Secondly, the presence of VOCs in industrially utilized gas mixtures can lead to faults, damage and reductions in efficiency in processing or feeding plants, which rapidly have financial effects. In membrane plants that are used for gas cleaning, filter capacity can be impaired by condensed terpenes, while ketones damage the seals, which shortens maintenance intervals and means that the membranes have to be replaced earlier and more frequently. Therefore, both in the field of waste air cleaning and in biogas processing, specific methods have been developed to separate VOCs from gas mixtures at an early stage.

US 2019/0001263 A1 discloses a method of removing $CO_2$, $O_2$, $N_2$ and VOC from biogas. In a first step, the gas is compressed and then the VOCs are removed successively by means of a first adsorber (preferably a "pressure temperature swing absorption", "PTSA" for short). Subsequently, by means of a cryogenic membrane, the $CO_2$ is removed and, finally, $O_2$ and $N_2$ are separated off by means of a second adsorber (preferably a PTSA), in order to obtain cleaned biogas. This method is relatively complex in that it has three separate separating means (two PTSAs and one membrane) and is therefore relatively costly and maintenance-intensive. The two parallel-running PTSAs in particular must be heated for regeneration of the adsorption medium and then cooled back down to operating temperature in order to assure a continuous process.

WO 2017099581 A2 discloses a method of cleaning a feed gas. This involves compressing the feed gas and removing water from the compressed gas. Subsequently, by means of an absorber, VOCs, carbon dioxide and any water are removed from the gas. One aim of the process in WO 2017099581 A2 is to extract the maximum amount of carbon dioxide from the feed gas in order to use this carbon dioxide further. The method was optimized such that the absorber is reprocessed by means of two series-connected absorption apparatuses and the constituents extracted from the feed gas are partly fed back to the cleaning process in order to minimize carbon dioxide loss. One disadvantage of the method described is that VOCs having a low boiling point cannot be removed, remain in the circuit because of the recycling and therefore accumulate in the plant. In this context, VOCs having a low boiling point mean compounds having a boiling point of below 50° C.

It is therefore an object of the present invention to eliminate the above-described disadvantages of the prior art and to provide an improved method of removing impurities, especially $CO_2$ and VOCs, from a methane-containing gas mixture, which permits efficient and effective reduction of the content of $CO_2$ and VOCs.

The object is achieved in accordance with the invention by a method and an apparatus. Preferred embodiments of the invention are reflected in the dependent claims.

In the method of the invention, in a first step a), a methane-containing gas mixture comprising $CO_2$ and at least one compound from the group of volatile organic compounds (VOCs) is provided. Rather than the expression "compound from the group of volatile organic compounds (VOCs)", the expression "VOC" is electively also used hereinafter. According to the invention, the at least one VOC is selected from the group consisting of ketones, sulfur-containing hydrocarbons and terpenes. Moreover, according to the invention, the VOC concentration in the methane-containing gas mixture is 10-10 000 ppm. In a second step b), the methane-containing gas mixture is compressed and cooled. In a third step c), the compressed, cooled methane-containing gas mixture is fed to an absorption apparatus, where the absorption apparatus comprises a liquid, reversibly VOC-absorbing absorbent. In a fourth step d), in the absorption apparatus, at least a portion of the VOCs and not more than 5% by volume of the $CO_2$ is absorbed by the absorbent from the methane-containing gas mixture, giving a methane-containing gas mixture having reduced levels of VOCs and $CO_2$, and an absorbent laden with VOCs and $CO_2$. In a fifth step e), the absorbent laden with VOCs and $CO_2$ from the absorption apparatus is fed to a desorption apparatus. In a sixth step f), the methane-containing gas mixture having reduced levels of VOCs and $CO_2$ from the absorption apparatus is fed to a separation apparatus comprising a membrane, in which the methane-containing gas mixture having reduced levels of VOCs and $CO_2$ is separated into a pressure-reduced, $CO_2$-enriched gas stream and an isobaric, methane-enriched gas stream. In a seventh step g), the desorption apparatus is supplied with a regeneration gas stream comprising at least a portion of the $CO_2$-enriched gas stream from step f) for regeneration of the VOC- and $CO_2$-laden absorbent to obtain an offgas stream comprising $CO_2$ and the at least one VOC and an at least partly regenerated absorbent. In an eighth step h), the offgas stream from the seventh step is removed from the desorption apparatus to a regenerative postcombustion apparatus, and the at least partly regenerated absorbent from the desorption apparatus is fed to the absorption apparatus.

In the context of the invention, the word "liquid" means a liquid state of matter under standard conditions, i.e. at ambient pressure 1 bar and 20° C.

In the context of the invention, the expression "reversibly absorbing" means a reversible interaction between an absorbent and a compound to be absorbed, whereby said compound binds reversibly to the absorbent and can also be parted therefrom again. It is not ruled out here that, for example, a reversibly VOC-absorbing absorbent can also reversibly absorb further compounds such as $CO_2$.

In the context of the invention, the term "absorbent" means a material capable of at least temporarily binding a compound to be absorbed.

Preference is given to using, in the method of the invention, an absorbent capable of dripping, i.e. an absorbent capable of droplet formation or of forming small liquid droplets. For water, for example, a droplet volume (i.e. the volume of a typical droplet) of about 50 µl is assumed. It will be clear to the person skilled in the art that the droplet volume has to be determined individually for each absorbent. The example of water serves here merely for orientation. The formation of droplets increases the surface area of the absorbent, which in turn increases the efficiency thereof. Preference is given to producing droplets using a conventional liquid distributor. Moreover, it is preferably also possible to use random packings or structured packings to better distribute the gas and hence to optimize contact between gas and absorbent. The design of the absorption apparatus is chosen here so as to work below the flooding point of a packing, or of an absorbent, in order to prevent it from being pushed out of the absorption apparatus by the gas stream. It is also possible to install physical barricades to prevent this entrainment. Droplet traps and meshes are conceivable.

In the context of the invention, the expression "pressure-reduced" means that the pressure of a gas is reduced, for example by expanding a gas.

Moreover, in the context of the invention, the term "isobaric" means that there is only insignificant change, if any, in the pressure conditions. Insignificant change means a change of up to ±5%.

Even though the steps in the method of the invention are numbered, it will be clear to the person skilled in the art that certain steps may also proceed in parallel. For example, steps e) and f) may take place in parallel.

The advantage of the method of the invention over known prior art methods is that, as a result of the local separation of the absorption and desorption of VOCs, the apparatuses—especially the vessels in the apparatuses in which the above-mentioned absorption and desorption take place—are not subject to any varying stress and hence the lifetime thereof is prolonged.

Exchange of the laden absorbent for less highly laden absorbent takes only a small amount of time and enables continuous purification of the methane-containing gas mixture. Moreover, the method of the invention lowers production costs for cleaned biogas since the method requires only one absorption apparatus, which can additionally be operated in a less expensive manner since the absorbent is regenerated and not consumed, as would be the case, for example, for activated carbon as absorbent.

A further advantage of the method of the invention over the prior art is that a liquid absorbent is used. This can therefore be pumped from a first vessel into a second vessel and is easier to handle than the adsorbents disclosed in the prior art, which typically take the form of bulk material.

The use of a membrane in the method of the invention additionally has the advantage that $CO_2$ can be separated off continuously, and the membrane, by contrast with other separation apparatuses, for example a PTSA, is less costly to maintain.

The use of $CO_2$ that comes from the membrane as regeneration gas has the advantage that it is virtually at ambient pressure and is virtually VOC-free. It is thus possible to lower costs that would arise in the provision of a separate regeneration gas, since it is consumed constantly. In the desorption of the VOCs from the absorbent, the latter is laden with $CO_2$ in the desorption apparatus and leaves the desorption apparatus as $CO_2$-laden absorbent. The cooling of the absorbent before entry into the absorption apparatus clears further absorption binding sites in the absorbent, as a result of which it can absorb $CO_2$ again in the absorption apparatus.

However, it will be clear to the person skilled in the art that the regeneration gas can also be provided separately, for example when the $CO_2$ gas stream from the membrane is used in some other way, or it is preferable to clean the absorbent with a different regeneration gas, for example $N_2$.

In a preferred embodiment of the method, a single absorption apparatus is used in step d). One advantage of the use of only one absorption apparatus rather than two series-connected absorption apparatuses as disclosed in the prior art is that a process with just one absorption apparatus is less expensive to construct and maintain than a plant with two or more absorption apparatuses.

In a further preferred embodiment of the method, the absorption apparatus in step d) comprises at least 4 stages. Stages in the context of the application mean intermediate plates in the absorption apparatus that divide the absorption process into separate sub-processes. The use of at least 4 stages in the absorption apparatus enables the absorption of a maximum concentration of a VOC, as will be shown later in FIGS. 3-11.

Preferably, in a step h), the offgas stream from the desorption apparatus which is generated in step g) is fed to a regenerative postcombustion apparatus for oxidation. This can oxidize both the VOCs and any methane constituents present, which allows the offgas stream to be released into the environment. Destruction of the VOCs saves additional disposal expenditure, which increases the viability of the overall plant for biogas processing. By virtue of the use of the $CO_2$-enriched permeate as regeneration gas, which is subjected to oxidation after use, what is called the methane slip in the $CO_2$-enriched permeate is also simultaneously subjected to oxidation, and emission into the atmosphere is prevented.

A regenerative postcombustion device generally consists of a mixing apparatus in which the gas mixture to be combusted is mixed with air as oxygen source, a heat exchanger apparatus in which the gas mixture mixed with air that is to be combusted is heated by the heat of the combusted gas mixture, with cooling of the combusted gas mixture, a combustion chamber in which the organic constituents of the gas mixture are fully oxidized, and a chimney through which the combusted gas mixture is released to the atmosphere.

In a preferred embodiment, at least steps f) and h), more preferably steps c) to h), are effected continuously. This has the advantage that the method of processing methane-containing gas can be operated more efficiently and economically than when the gas is processed merely batchwise. Moreover, continuous operation, by contrast with cyclical changeover as normally suggested in the prior art, is less prone to faults since no fault-prone fittings are required for monitoring of the changeover.

In a preferred embodiment, in step c), 2 to 10 liters of absorbent per $Bm^3$ of methane-containing gas mixture from step b) is used in the absorption apparatus.

The unit $Bm^3$, which stands for working cubic meters, in the context of the application defines the actual volume of the gas present in the working state. The working volume of the gas can be ascertained in a first approximation with sufficient accuracy with the aid of the ideal gas equation.

Preferably, in step g), 1 to 3 liters of VOC-laden absorbent from step d) is regenerated with 1 $Bm^3$ of $CO_2$-enriched gas from step f) in the desorption apparatus.

In a preferred embodiment, the VOC-absorbing absorbent has a boiling point of >250° C. at 1013.25 mbar and comprises a compound selected from the group consisting of polyethylene glycol (PEG), mineral oil, esters or combinations thereof, more preferably polyethylene glycol.

Absorbents having the abovementioned properties are of particularly good suitability for the method of the invention since they efficiently absorb and desorb VOCs, and under clearly separated conditions without any particular cost and inconvenience to achieve these conditions. This means that these absorbents can assure a favorable and efficient processing method.

The reversibly VOC-absorbing absorbent preferably comprises a compound of the formula (I):

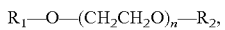

where n=3 to 8 and
$R_1$ and $R_2$ are independently selected linear $C_1$-$C_{10}$ alkyls.
Based on the formula (I), the reversibly VOC-absorbing absorbent is more preferably a compound (Ia)

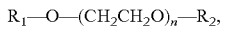

where n=11 and $R_1$ and $R_2$=$CH_3$.
The preferred compound (Ia) is thus

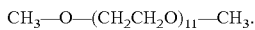

A further preferred absorbent is known by the Genosorb 300 name with CAS No. 24991-55-7.

It has been found that, surprisingly, the absorbents of the formula (I), for the reasons given above, are of particularly good suitability for the method of the invention.

A further preferred absorbent is the stabilized reaction product of 5,8,11,14-tetraoxaoctadecane and 5,8,11,14,17-pentaoxaheneicosane—also known as Genosorb 1843.

In a preferred embodiment, the at least one VOC has a vapor pressure of at least 0.1 mbar at 20° C. and/or a boiling point of at most 240° C. at 1013.25 mbar.

In a preferred embodiment, the at least one VOC is selected from the group consisting of acetone, 2-butanone, 3-methyl-2-butanone, 2-pentanone, 3-pentanone, 3,3-dimethyl-2-butanone, 2-methyl-3-pentanone, 4-methyl-2-pentanone, 3-methyl-2-pentanone, 3-hexanone, 2-hexanone, 5-methyl-3-hexanone, 3-methyl-2-hexanone, 2-heptanone, 4-octanone, 3-octanone, 2-octanone, 2,9-decanedione, α-thujene, α-pinene, camphene, sabinene, β-pinene, myrcene, 3-carene, thujanone, thujopsene, thymol, α-terpinene, β-caryophyllene, 1,4-cineol, eucalyptol, fenchone, γ-terpinene, terpinolene, limonene, tricyclene, linalool, menthone, nopinone, p-menthan-2-one, p-menthan-2-ol, camphor, carvomenthone, 3,3-dimethyl-2-bornanone, carbonyl sulfide, methyl mercaptan, ethyl mercaptan, dimethyl sulfide, carbon disulfide, 2-propanethiol, 2-methyl-2-propanethiol, 1-propanethiol, thiophene, 2-butanethiol, isobutyl mercaptan, methyl allyl sulfide, methyl propyl sulfide, butanethiol, dimethyl disulfide, 2-methylthiophene, 3-methylthiophene, tetrahydrothiophene, 1-pentanethiol, thiophenol, dimethyl trisulfide, diisopropyl disulfide, dimethyl tetrasulfide, methyl propyl disulfide and methyl isopropyl disulfide. It will be apparent that it is also possible to use mixtures of the compounds mentioned.

It has been found that the method of the invention is also suitable for processing a gas mixture comprising at least two VOCs. The gas mixture accordingly preferably comprises at least one further VOC selected from the group consisting of aldehydes, alcohols, amines, BTEX, esters, ethers, CFCs, and siloxanes.

In a preferred embodiment, the at least one further VOC is selected from the group consisting of linear or branched $C_1$-$C_5$ alcohols, sulfides and terpenes.

The at least one further VOC is preferably selected from the group consisting of 2-methylbutyraldehyde, acetaldehyde, decanal, formaldehyde, hexanal, iso-butyraldehyde, isopentanal, n-butyraldehyde, propylaldehyde, 1-butanol, 1-propanol, 2-butanol, 2-ethylhexanol, 2-methyl-1-butanol, 2-methyl-1-propanol, 2-methyl-2-butanol, 2-methyl-3-pentanol, 3-methyl-1-butanol, 3-pentanol, ethanol, isopropanol, methanol, 4,4-dimethyloxazolidine, 1,4-dimethylpiperazine, 1-methylpiperazine, 1-methylpyrrole, 4-methylpiperazine-1-ethanol, dimethylaminoethanol, dimethylpiperazine, methyldiethanolamine, N-aminoethanolpiperazine, piperazine, pyridine, 1,2,3-trimethylbenzene, 1,2,4-trimethylbenzene, 1,3,5-trimethylbenzene, benzene, ethylbenzene, ethyltoluene, m-xylene, o-xylene, propylbenzene, p-xylene, styrene, toluene, 6,6-dimethyl-tetrahydropyran-2-one, ethyl butyrate, methyl butyrate, propyl butyrate, dimethyl carbonate, ethyl acetate, ethyl heptanoate, methyl hexanoate, ethyl isobutyrate, methyl isobutyrate, isopropyl acetate, methyl acetate, methyl formate, n-butyl acetate, n-propyl acetate, n-propyl propionate, ethyl pentanoate, methyl pentanoate, ethyl propionate, methyl propionate, sec-butyl acetate, 1,3-dioxane, 1,3-dioxolane, 2,4,5-trimethyl-1,3-dioxolane, 2-butylfuran, 2-ethyl-2-methyl-1,3-dioxolane, 2-ethyl-4-methyl-1,3-dioxolane, 2-ethyl-5-methylfuran, 2-ethylfuran, 5,6-dihydro-2-methyl-2H-pyran, 2-methylfuran, 2-propylfuran, 3-methylfuran, diethyl ether, dimethylfuran, methyl-1,3-dioxane, pentylfuran, tetrahydrofuran, trimethyldioxolane, 1,1,2,2-tetrachloroethane, 1,1,2-trichloroethane, 1,2-dibromoethane, 1,2-dichlorobenzene, 1,2-dichloroethane, 1,2-dichloropropane, 1,3-dichlorobenzene, 1,4-dichlorobenzene, benzyl chloride, chloroethane, chloromethane, chloroform, dichloromethane, tetrachloroethene, trichlorofluoromethane, trichlorofluoromethane, vinyl chloride, 2,3-butanedione, 2,4-dimethylpentan-3-one, 2-methylhexan-3-one, 3,3-dimethyl-2-butanone, 3-ethylcyclopentanone, 3-heptanone, 4-ethylcyclohexanone, 4-methylhexan-3-one, 6-methylheptan-2-one, cyclohexanone, cyclopentanone, 2-methylcyclopentanone, 3-methylcyclopentanone, hydroxybutanone, 1,4-pentadiene, 2-methyl-1-butene, 1,1-dimethylcyclopropane, 1,3-butadiene, 1-nonene, 1-octene, 1-pentene, 2,2,4-trimethylpentane, 2,2-dimethylbutane, 2,3-dimethyloctane, 2,4-hexadiene, 2,6-dimethyloctane, 2-methyl-2-butene, 2-methylbutane, 2-methylhexane, 2-methylpentane, 2-nonene, 2-octene, 3-methyl-1-butene, 3-methylhexane, 3-methyloctane, 3-methylpentane, 4-methyloctane, 4-octene, butane, butene, cumene, cyclohexane, cyclopentene, trans-1,2-dimethylcyclopropane, decane, dimethyloctene, heptane, hexane, isobutane, methylcyclohexane, methylcyclohexene, methylcyclopentane, naphthalene, n-dodecane, nonane, nonene, n-tetradecane, n-tetradecane, n-tridecane, n-tridecane, octane, pentane, propane, propene, tetramethylbenzene, undecane, decamethylcyclopentasiloxane, decamethyltetrasiloxane, dodecamethylcyclohexasiloxane, dodecamethylpentasiloxane, ethoxytrimethylsilane, fluorotrimethylsilane, hexamethylcyclotrisiloxane, hexamethyldisiloxane, hydroxytrimethylsilane, octamethylcyclotetrasiloxane, octamethyltrisiloxane, 1-ethyl-1H-pyrrole, acetonitrile, isobutyric acid, methylpropanenitrile, 1-(methylthio)-1-propene, 2-ethyl-5-methylthiazole, 2-ethylthiophene, 2-propylthiophene, 3-pentanethiol, dipropyl disulfide, dipropyl trisulfide, methyl ethyl disulfide, methyl propyl disulfide, methylthiirane, methylthiopropane, 1-(methylthio)pentane, sec-butyl propyl disulfide, 2,6-dimethyl-2,6-octadiene, 2,6-dimethyl-4-octene, 2-carene, 3,3,5-trimethyl-1,5-heptadiene, 3,6,6-trimethylbicyclo-[3.1.1]-heptan-2-one, 3,7-dimethyl-2,4-octadiene, alloaromadendrene, α-phellandrene, α-terpineol, α-copaene, α-cubebene, α-gurjunene, α-pinocarvone, α-terpineol acetate, β-elemene, carane, dihydromyrcene, dihydroumbellulone, isomenthol, myrtanol, p,α,α-trimethylbenzyl alcohol, p-cymene, phellandrene, pinocamphone, p-menth-3-ene, terpinen-4-ol, α-caryophyllene and γ-cadinene.

Preferably, the methane-containing gas mixture is compressed in step b) to 6 to 24 bar (g), preferably 10 to 20 bar (g), and more preferably to 14 to 18 bar (g), since, in these pressure ranges, the methane-containing gas can be processed particularly efficiently.

In a preferred embodiment, the methane-containing gas mixture is cooled in step b) to 0° C. to 20° C., preferably to 2° C. to 10° C., since, in these temperature ranges, the VOCs are absorbed efficiently by the absorbent.

Preferably, the VOC-laden absorbent from step d), before being transported into the desorption apparatus, is heated to 30° C. to 90° C., more preferably to 50° C. to 70° C. Heating of the absorbent allows it to be regenerated more easily and efficiently in the desorption apparatus.

In a preferred embodiment, the regenerated absorbent from step g), before being recycled into the absorption apparatus, is cooled, preferably to 0° C. to 20° C., more preferably to 2° C. to 10° C.

In a preferred embodiment, in step c), the liquid, reversibly VOC-absorbing absorbent is fed to the absorption apparatus at a mass flow rate of at least 6 kg/Bm$^3$, preferably of at least 7 kg/Bm$^3$ and more preferably of at least 7.8 kg/Bm$^3$ of gas mixtures. The mass flow rate of at least 6 kg/Bm$^3$, preferably of at least 7 kg/Bm$^3$ and more preferably of at least 7.8 kg/Bm$^3$ of gas mixtures for the liquid, reversibly VOC-absorbing absorbent makes it possible also to absorb VOCs having a low boiling point (of below 50° C.) and hence to remove them from the gas mixture. For example, it has been found that a volume flow rate of 7.8 kg of absorbent per working cubic meter of gas mixture is ideal in order to remove the VOC substance dimethyl sulfide having a boiling point of 37° C. at standard pressure. The density of the absorbent in this embodiment is roughly 0.9 to 1.1 kg/l.

A further aspect of the invention relates to an apparatus for processing of methane-containing gas by the method of the invention. Said apparatus comprises the following components:

a gas source,
a cooling apparatus,
a compressor,
an absorption apparatus having an upper end and a lower end,
a desorption apparatus having an upper end and a lower end,
a separation apparatus,
a first connecting conduit that connects the lower end of the desorption apparatus to the upper end of the absorption apparatus,
a second connecting conduit that connects the lower end of the absorption apparatus to the upper end of the desorption apparatus,
a third connecting conduit that connects the upper end of the absorption apparatus to the separation apparatus,
a fourth connecting conduit that connects the separation apparatus to the lower end of the desorption apparatus.

Figure 2:
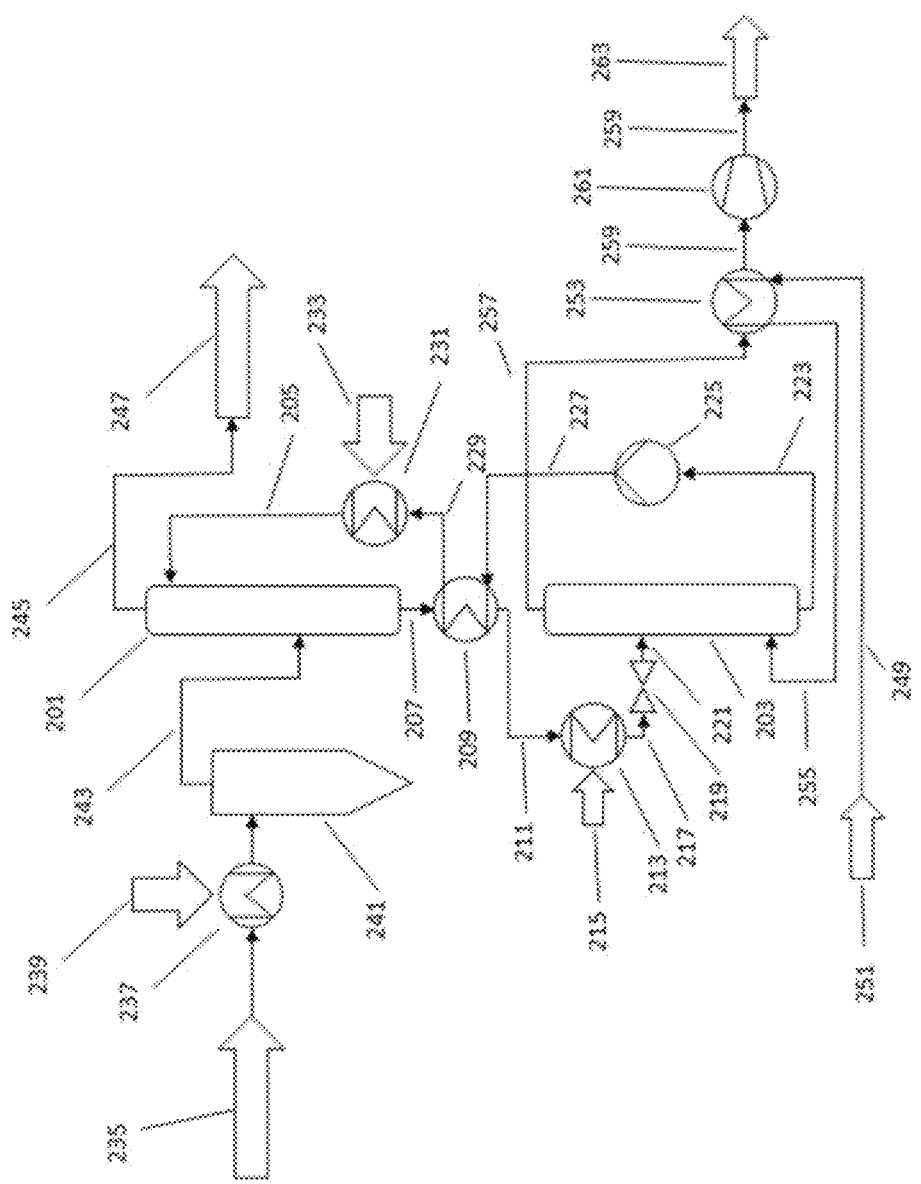
Figure 12:
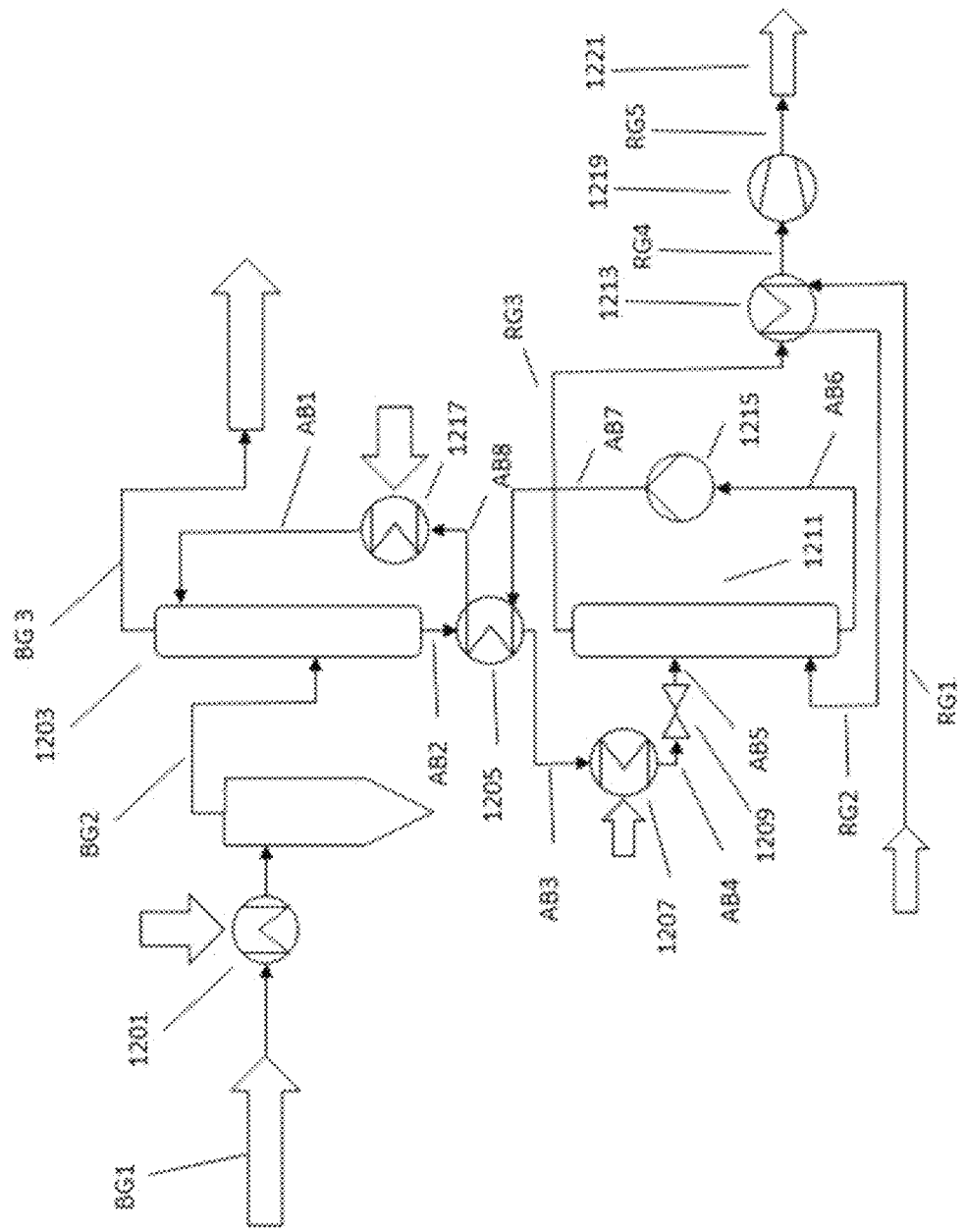

The invention is elucidated in detail hereinafter with reference to the working examples described and appended. The figures show, in purely schematic form:

FIG. 1 a schematic diagram of a preferred embodiment of the method of the invention for purification of methane-containing gas;
FIG. 2 the construction of an in silico simulation model;
FIG. 3 a step diagram for the VOC methyl mercaptan;
FIG. 4 a step diagram for the VOC dimethyl sulfide;
FIG. 5 a step diagram for the VOC acetone;
FIG. 6 a step diagram for the VOC 2-butanone;
FIG. 7 a step diagram for the VOC 1-propanol;
FIG. 8 a step diagram for the VOC toluene;
FIG. 9 a step diagram for the VOC limonene;
FIG. 10 a diagram of measured VOC concentrations in plants that produce biogas from renewable raw materials; and
FIG. 11 a diagram of measured VOC concentrations in plants that produce biogas from waste;
FIG. 12 the construction of an in silico simulation model.

In the preferred embodiment of the method of the invention which is shown in schematic form in FIG. 1, in a first step, a methane-containing gas mixture from a gas source 101 is provided. The gas mixture 103 comprises $CO_2$ and at least one compound from the group of volatile organic compounds (VOCs). The methane-containing gas mixture 103 is compressed in a compressor 105 to 14-18 bar (g) and then cooled in a cooling apparatus 107 to 2-10° C.

Subsequently, the methane-containing gas mixture 103 is fed to an absorption apparatus 109. The methane-containing gas mixture 103 is introduced here at a lower end 111 of the absorption apparatus 109 and rises upward to an upper end 113 of the absorption apparatus 109.

The words "top" and "bottom" relate to the orientation of the respective apparatuses which is shown in the figures.

Moreover, the absorption apparatus 109 is supplied with a liquid absorbent 117 via a first connecting conduit 115 that opens into the absorption apparatus 109 in the region of the upper end 113. This liquid absorbent 117 flows in droplet form from the upper end 113 to the lower end 111 of the absorption apparatus 109, and comes into contact with the opposing flow of methane-containing gas mixture 103. Contact of the absorbent 117 with the methane-containing gas mixture 103 results in reversible binding of the VOCs present in the gas mixture in the absorbent 117, as a result of which a methane-containing gas mixture 119 having reduced VOC levels is obtained at the upper end 113 of the absorption apparatus 109, while a VOC-laden absorbent 121 collects at the lower end 111 of the absorption apparatus 109. The methane-containing gas mixture 119 having reduced VOC levels is conveyed via a second connecting conduit 123 proceeding from the upper end 113 of the absorption apparatus 109 to a separation apparatus 125. The VOC-laden absorbent 121 is pumped via a third connecting conduit 127 from the lower end 111 of the absorption apparatus 109 by means of a pump (not shown) to a heat exchanger apparatus 129, and heated to 50-70° C. therein. Subsequently, the VOC-laden absorbent 121 is pumped further to an upper end 133 of a desorption apparatus 135 and fed to the desorption apparatus 135. In the separation apparatus 125, the methane-containing gas mixture 119 having reduced VOC levels is separated into a pressure-reduced, $CO_2$-enriched gas stream 137 (pressure −0.5 to +0.5 bar (g)) and an isobaric, methane-enriched gas stream 139 (pressure 14-18 bar (g)). The $CO_2$-enriched gas stream 137 is then introduced via a fourth connecting conduit 143 at a lower end 141 of the desorption apparatus 135 and rises to the upper end 133 of the desorption apparatus 135. While the liquid, VOC-laden absorbent 121 is flowing in droplet form from the upper end 133 to the lower end 141 of the desorption apparatus 135, it comes into contact with an opposing flow of $CO_2$-enriched gas stream 137. As a result of the heating of the liquid, VOC-laden absorbent 121, the bound VOCs are reversibly released and flow together with the $CO_2$-enriched gas stream 137 to the upper end 133 of the desorption apparatus 135. This gives rise to a purified absorbent 145 that collect at the lower end 141 of the desorption apparatus 135. A fifth connecting conduit 147 conveys the purified absorbent 145 by means of a pump (not shown) to the heat exchanger apparatus 129, where it is cooled to 2-10° C. and then pumped via the feed conduit 115 to the upper end 113 of the absorption apparatus 109. The heat exchanger apparatus 129 may comprise multiple separate heat exchangers 131, 131', 131". At the upper end 133 of the desorption apparatus 135, a $CO_2$- and VOC-enriched gas stream 149 is removed and sent to a regenerative postcombustion apparatus 151 in order to reduce environmental pollution by the method.

For utilization of methane-containing gases as natural gas substitute, sulfur-containing components in the product gas have to be lowered below a limit of 6 mg/m$^3$ sulfur equivalent. The limit is set out, for example, in Rulebook G260 from the DVGW [German Technical and Scientific Association for Gas and Water].

For other VOCs, for example, limits are applicable for the utilization of gas permeation membranes. In that case, it is necessary for the total VOC concentration to be below 10 ppm, in order, for example, to satisfy the utilization conditions of Evonik (manufacturer of gas permeation membranes).

A further reason for discussions about limitation of VOCs in biogas are extraneous odors that can be caused by the VOCs.

FIG. 2 shows an in silico simulation model of a preferred embodiment of the method of the invention. The simulation model comprises an absorption apparatus 201 and a desorption apparatus 203. The absorbent—PEG here—enters the absorption apparatus 201 as a liquid 205. The absorbent leaves the absorption apparatus 201 as a VOC-laden liquid 207 and is heated in a heat exchanger 209. The heated, VOC-laden absorbent 211 thus obtained is conveyed from the heat exchanger 209 to a further heat exchanger 213 and heated further therein. The heat exchanger 213 is supplied here with external heat 215. A significantly heated, VOC-laden absorbent 217 leaves the heat exchanger 213 and is expanded in a control valve 219. The heated, expanded, VOC-laden absorbent 221 enters the desorption apparatus 203, where it releases the VOCs. The largely regenerated, heated, expanded absorbent 223 is compressed by a pump 225 and transported further to the heat exchanger 209 as compressed, heated, largely regenerated absorbent 227. In the heat exchanger 209, it releases some of its heat to the VOC-laden absorbent 207. The cooler, compressed, largely regenerated absorbent 229 is then transported to a further heat exchanger 231 and cooled further therein. For this purpose, the heat exchanger 231 is supplied with external cooling 233. The cooled, compressed, largely regenerated absorbent 205 enters the absorption apparatus 201 again and thus completes the absorbent circuit. A compressed biogas 235 to be cleaned is cooled by means of external cooling 239 in a heat exchanger 237 and then freed of condensate in a condensate separator 241. A resulting cooled, compressed biogas 243 is fed to the absorption apparatus 201, where it comes into contact with the cooled, compressed, largely regenerated absorbent 205 and releases its VOCs to the absorbent 205. A cleaned biogas 245 exits from the absorption apparatus 201 and can then be used for further processes 247. A regeneration gas 249, for example a lean gas from biogas processing 251, is fed to a heat exchanger 253 and heated therein. A heated regeneration gas 255 enters the desorption apparatus 203 and releases the VOC therein from the heated, expanded, VOC-laden absorbent 221. A VOC-laden regeneration gas 257 then exits from the desorption apparatus 203 and releases its heat to the regeneration gas 249 in the heat exchanger 253. A cooled, VOC-laden regeneration gas 259 is conveyed by means of a suction blower 261 to an aftertreatment unit 263.

In the above-described computer simulation, by means of Henry's law, the solubility of a particular VOC in the absorbent, PEG here, was simulated. In a first step, the equilibrium line where the gas phase and the liquid phase are at equilibrium is simulated; the slope of the equilibrium line corresponds to the Henry coefficient of the compound at the respective temperature. In a second step, the mass balance line that results from the mass balance of the VOC in the absorption apparatus is simulated. The starting point of the mass balance lines is at the VOC concentration at the upper end of the absorption apparatus (cleaned biogas 245) and the concentration of the liquid phase at the upper end of the absorption apparatus (regenerated PEG 205). The end point of the mass balance line is found from the gas phase concentration at the lower end of the absorption apparatus (VOC-laden biogas 243) and the concentration of the liquid phase at the lower end of the absorption apparatus (VOC-laden PEG 207). The start and end points of the mass balance lines are connected by a straight line (mass balance line). This is only applicable under the assumption that the temperature in the absorption apparatus is constant. In the case of a temperature gradient, both the mass balance line and the equilibrium line would be shown as a mass balance curve and an equilibrium curve. A step construction can be drawn between the mass balance lines and the equilibrium lines. Each step represents one theoretical plate of the column. The number of steps is a measure of the required height of the absorption apparatus. In an absorption, the mass balance line is always above the equilibrium line. If the mass balance line is below the equilibrium line, the operation is a desorption.

FIG. 3a shows an analogous step diagram for the VOC methyl mercaptan (CAS 74-93-1) and PEG as absorbent in the absorption apparatus. The mass balance line (dashed line) is arranged above the equilibrium line (dashed-and-dotted line), and the step construction (solid line) is shown in between.

FIG. 3b shows a step diagram analogous to the above-described step diagram for the VOC methyl mercaptan (CAS 74-93-1) and PEG as absorbent in the desorption apparatus. The equilibrium line (dashed-and-dotted line) is arranged above the mass balance line (dashed line), and the step construction (solid line) is shown in between. It is apparent from FIG. 3a that a step construction is unviable for methyl mercaptan since a large residue of methyl mercaptan remains in the cleaned biogas if the stream of absorbent was too small (in the simulation model). It is apparent from FIG. 3b that the absorbent is regenerated virtually completely in the desorption apparatus to free it of methyl mercaptan.

FIGS. 4a and 4b show, analogously to the above-described step diagrams, a step diagram for the VOC dimethyl sulfide (CAS 75-18-3) and PEG as absorbent in the absorption apparatus (FIG. 4a) and in the desorption apparatus (FIG. 4b). It is apparent from FIG. 4a that a multitude of steps is needed for cleaning of the biogas and a residue of dimethyl sulfide nevertheless remains in the biogas. It is apparent from FIG. 4b that the absorbent is regenerated virtually completely in the desorption apparatus to free it of dimethyl sulfide.

FIGS. 5a and 5b, analogously to the step diagrams described above, show exactly such step diagrams for the VOC acetone (CAS 67-64-1) and PEG as absorbent in the absorption apparatus (FIG. 5a) and in the desorption apparatus (FIG. 5b). It is apparent from FIG. 5a that a multitude of steps is needed for cleaning of the biogas and a very small residue of acetone nevertheless remains in the biogas. It is apparent from FIG. 5b that the absorbent is regenerated virtually completely in the desorption apparatus to free it of acetone.

FIGS. 6a and 6b, analogously to the step diagrams described above, show exactly such step diagrams for the VOC 2-butanone (CAS 78-93-3) and PEG as absorbent in the absorption apparatus (FIG. 6a) and in the desorption apparatus (FIG. 6b). It is apparent from FIG. 6a that only a few steps are needed for cleaning of the biogas and no residue of 2-butanone remains in the biogas. It is apparent from FIG. 6b that the absorbent is regenerated in the desorption apparatus to free it of 2-butanone by means of a multitude of steps, but a small portion of 2-butanone remains in the regenerated absorbent.

FIGS. 7a and 7b show, analogously to the above-described diagrams, step diagrams for the VOC 1-propanol (CAS 71-23-8) and PEG as absorbent in the absorption apparatus (FIG. 7a) and in the desorption apparatus (FIG. 7b). It is apparent from FIG. 7a that only a few steps are needed for cleaning of the biogas, and a very small residue of 1-propanol remains in the biogas. It is apparent from FIG. 7b that, in spite of a multitude of steps, the absorbent is not fully regenerated in the desorption apparatus to free it of 1-propanol.

FIGS. 8a and 8b show step diagrams created analogously to the above-described diagrams for the VOC toluene (CAS 108-88-3) and PEG as absorbent in the absorption apparatus (FIG. 8a) and in the desorption apparatus (FIG. 8b). It is apparent from FIG. 8a that only a few steps are needed for cleaning of the biogas, but a residue of toluene remains in the biogas since it was incompletely regenerated. It is apparent from FIG. 8b that, in spite of a multitude of steps, the absorbent is not fully regenerated in the desorption apparatus to free it of toluene. Since the mass balance line and the equilibrium line run parallel, complete regeneration is impossible.

FIGS. 9a and 9b show analogously created step diagrams for the VOC limonene (CAS 7705-14-8) and PEG as absorbent in the absorption apparatus (FIG. 9a) and in the desorption apparatus (FIG. 9b). It is apparent from FIG. 9a that only a few steps are needed for cleaning of the biogas, but a residue of limonene remains in the biogas since it was incompletely regenerated. It is apparent from FIG. 9b that, in spite of a multitude of steps, the absorbent is not fully regenerated in the desorption apparatus to free it of limonene since the mass flow of the absorbent is too high (in the simulation model).

On the basis of the simulation according to FIGS. 2 to 9, it can be stated that VOCs having a boiling point between 35° C. and 100° C. can be virtually fully released from the biogas in the absorption apparatus and virtually fully released from the absorbent in the desorption apparatus. VOCs having a boiling point higher than 100° C. are virtually fully removed from the biogas. However, the regeneration of the absorbent is incomplete. VOCs having a boiling point of less than 35° C. are incompletely removed from the biogas. The gas constituents $CO_2$ and methane remain almost entirely in the gas phase.

FIG. 10 shows a diagram based on 48 measurements of VOCs in biogas samples, where the biogas was produced from renewable raw material. The concentration of VOCs in the biogas is between 5 and 20 ppm. Individual values are higher. VOCs in biogas from renewable raw materials do not present any problems in further processing.

FIG. 11 shows a diagram based on 138 measurements of VOCs in biogas samples, where the biogas was produced from waste. The concentration of VOCs in the biogas is between 10 and 250 ppm. Higher concentrations were also achieved in numerous cases. VOCs in biogas from waste frequently present problems in further processing; therefore, controlled removal of the VOCs is necessary.

Experimental Data

FIG. 12 shows the in silico simulation model of the preferred embodiment of the method of the invention as described in FIG. 2. Various parameters for the biogas, absorbent and the regeneration gas were added to the simulation model in order to show what amount of $CO_2$ and VOC is absorbed. The simulation model comprises three gas streams at different stages. A compressed methane-containing gas BG1 is fed to a heat exchanger 1201, and leaves it as a cooled compressed methane-containing gas BG2. The methane-containing gas BG2 is fed to an absorption apparatus 1203, wherein the $CO_2$ and VOC constituents present in the methane-containing gas BG2 are absorbed. A methane-containing gas BG3 having reduced levels of $CO_2$ and VOCs leaves the absorption apparatus 1203. In the absorption apparatus 1203, the methane-containing gas BG2 comes into contact with a cooled regenerated absorbent AB1. The cooled regenerated absorbent AB1 absorbs $CO_2$ and VOCs in the absorption apparatus 1203, and leaves the absorption apparatus 1203 as a $CO_2$- and VOC-laden absorbent AB2. The $CO_2$- and VOC-laden absorbent AB2 is heated in a heat exchanger 1205 and leaves it as a heated $CO_2$- and VOC-laden absorbent AB3. The heated $CO_2$- and VOC-laden absorbent AB3 is heated further in a further heat exchanger 1207 and leaves it as a heated $CO_2$- and VOC-laden absorbent AB4. The heated $CO_2$- and VOC-laden absorbent AB4 is fed to a control valve 1209 and expanded, and leaves it as a heated, expanded, $CO_2$- and VOC-laden absorbent AB5. The heated, expanded, $CO_2$- and VOC-laden absorbent AB5 is fed to a desorption apparatus 1211.

A regeneration gas RG1 is heated in a heat exchanger 1213 and leaves it as a heated regeneration gas RG2. The regeneration gas RG1 is a gas stream with $CO_2$ as its main constituent. The heated regeneration gas RG2 is fed to the desorption apparatus 1211 and comes into contact therein with the heated, expanded, $CO_2$- and VOC-laden absorbent AB5. The heated regeneration gas RG2 releases $CO_2$ and VOC from the absorbent AB5 to obtain a $CO_2$- and VOC-laden regeneration gas RG3 and a largely regenerated, heated, expanded absorbent AB6. The largely regenerated, heated, expanded absorbent AB6 is compressed in a pump 1215 and fed to the heat exchanger 1205 as a compressed, heated, largely regenerated absorbent AB7. In the heat exchanger 1205, the compressed, heated, largely regenerated absorbent AB7 releases its heat to the $CO_2$- and VOC-laden absorbent AB2 and leaves the heat exchanger 1205 as a cool, compressed, largely regenerated absorbent AB8. The cool, compressed, largely regenerated absorbent AB8 is fed to a heat exchanger 1217 and cooled, and leaves it as a cooled regenerated absorbent AB1. The $CO_2$- and VOC-laden regeneration gas RG3 is fed to the heat exchanger 1213, releases its heat to the regeneration gas RG1 and leaves the heat exchanger 1213 as a cooled, $CO_2$- and VOC-laden regeneration gas RG4. The cooled, $CO_2$- and VOC-laden regeneration gas RG4 is conveyed in a suction blower 1219 as a cooled, $CO_2$- and VOC-laden regeneration gas RG5 to an aftertreatment unit 1221.

Table 1 below shows parameters for the simulation model with the absorbent PEG1843. This absorbent absorbs only 2.5 kg/h of methane (0.4%), while 36.6 kg/h of $CO_2$ (3.6%) and more than 98% of the VOCs (dimethyl sulfide (DMS), acetone, 2-butanone and terpene) are absorbed. It should be noted here that VOCs having low boiling point such as DMS (boiling point 37° C.), having moderate boiling point such as acetone (boiling point 56° C.) and 2-butanone (boiling point 79.6° C.), and having high boiling point such as terpenes (boiling point 140-230° C.) are absorbed.

This is apparent from the differences in mass between BG2 and BG3. The 36.6 kg/h of $CO_2$ and the VOCs are released from the methane-containing gas BG2 to the absorbent AB1, which is apparent in the increase in $CO_2$ and VOC concentrations from AB1 to AB5. The VOC- and $CO_2$-laden absorbent then passes the 36.6 kg/h of $CO_2$ and VOC onward to the regeneration gas RG1, which is apparent in the increase in $CO_2$ and VOC concentrations from RG1 to RG3.

TABLE 1

|  |  | BG2 | BG3 | RG1 | RG5 | AB1 | AB5 |
| --- | --- | --- | --- | --- | --- | --- | --- |
| Mass flow rate | [kg/h] | 1585 | 1540 | 732 | 777 | 645 | 689 |
| Volume flow rate | [m³/h] | 83.9 | 82.3 | 365.8 | 435.7 | 0.693 | 0.774 |
| Temperature | [° C.] | 8 | 8 | 20 | 55 | 8 | 57 |
| Pressure | [bar(g)] | 15 | 15 | 0.1 | 0.1 | 15 | 0.1 |
| CH4 | [kg/h] | 557.5 | 555.0 | 2.1 | 4.6 | 0.00 | 2.51 |
| CO2 | [kg/h] | 1022.0 | 985.4 | 730.0 | 766.6 | 0.14 | 36.76 |
| DMS | [kg/h] | 0.04 | 0.00 | 0.00 | 0.03 | 0.00 | 0.03 |
| Acetone | [kg/h] | 0.34 | 0.00 | 0.00 | 0.34 | 0.00 | 0.34 |
| 2-Butanone | [kg/h] | 0.42 | 0.00 | 0.00 | 0.42 | 0.03 | 0.44 |
| Terpenes | [kg/h] | 3.95 | 0.06 | 0.00 | 3.88 | 44.51 | 48.40 |
| H2O | [kg/h] | 0.69 | 0.00 | 0.00 | 0.69 | 0.03 | 0.70 |
| PEG | [kg/h] | 0.00 | 0.00 | 0.00 | 0.06 | 600.00 | 600.00 |

Tables 2 to 4 show similar parameter configurations to table 1 and differ from table 1 merely in that the temperature of the regeneration gases RG1 and RG3 and of the absorbent AB5 and the mass flow rate of RG1, RG3, AB1 and AB5 was varied.

Tables 5 to 8 show the same parameter configurations as tables 1 to 4; the only change in the simulation model was of the absorbent from PEG1843 (tables 1-4) to PEG300 (tables 5-8).

TABLE 2

|  |  | BG2 | BG3 | RG1 | RG5 | AB1 | AB5 |
| --- | --- | --- | --- | --- | --- | --- | --- |
| Mass flow rate | [kg/h] | 1585 | 1541 | 732 | 776 | 846 | 890 |
| Volume flow rate | [m³/h] | 83.9 | 82.3 | 365.8 | 389.1 | 0.910 | 0.969 |
| Temperature | [° C.] | 8 | 8 | 20 | 20 | 8 | 22 |
| Pressure | [bar(g)] | 15 | 15 | 0.1 | 0.1 | 15 | 0.1 |
| CH4 | [kg/h] | 557.5 | 555.0 | 2.1 | 4.6 | 0.00 | 2.51 |
| CO2 | [kg/h] | 1022.0 | 985.5 | 730.0 | 766.5 | 0.22 | 36.76 |
| DMS | [kg/h] | 0.04 | 0.00 | 0.00 | 0.03 | 0.00 | 0.04 |
| Acetone | [kg/h] | 0.34 | 0.00 | 0.00 | 0.33 | 0.01 | 0.35 |
| 2-Butanone | [kg/h] | 0.42 | 0.002 | 0.00 | 0.40 | 0.22 | 0.62 |
| Terpenes | [kg/h] | 3.95 | 0.35 | 0.00 | 3.60 | 245.54 | 249.14 |

TABLE 2-continued

|  |  | BG2 | BG3 | RG1 | RG5 | AB1 | AB5 |
|---|---|---|---|---|---|---|---|
| H2O | [kg/h] | 0.69 | 0.03 | 0.00 | 0.66 | 0.36 | 1.01 |
| PEG | [kg/h] | 0.00 | 0.00 | 0.00 | 0.00 | 600.00 | 600.00 |

TABLE 3

|  |  | BG2 | BG3 | RG1 | RG5 | AB1 | AB5 |
|---|---|---|---|---|---|---|---|
| Mass flow rate | [kg/h] | 1585 | 1540 | 732 | 777 | 638 | 682 |
| Volume flow rate | [m$^3$/h] | 83.9 | 82.3 | 403.3 | 435.7 | 0.686 | 0.767 |
| Temperature | [° C.] | 8 | 8 | 50 | 55 | 8 | 57 |
| Pressure | [bar(g)] | 15 | 15 | 0.1 | 0.1 | 15 | 0.1 |
| CH4 | [kg/h] | 557.5 | 555.0 | 2.1 | 4.6 | 0.00 | 2.51 |
| CO2 | [kg/h] | 1022.0 | 985.4 | 730.0 | 766.7 | 0.10 | 36.76 |
| DMS | [kg/h] | 0.04 | 0.00 | 0.00 | 0.03 | 0.00 | 0.03 |
| Acetone | [kg/h] | 0.34 | 0.00 | 0.00 | 0.34 | 0.00 | 0.34 |
| 2-Butanone | [kg/h] | 0.42 | 0.00 | 0.00 | 0.42 | 0.01 | 0.42 |
| Terpenes | [kg/h] | 3.95 | 0.05 | 0.00 | 3.89 | 37.64 | 41.54 |
| H2O | [kg/h] | 0.69 | 0.00 | 0.00 | 0.69 | 0.00 | 0.68 |
| PEG | [kg/h] | 0.00 | 0.00 | 0.00 | 0.06 | 600.00 | 600.0 |

TABLE 4

|  |  | BG2 | BG3 | RG1 | RG5 | AB1 | AB5 |
|---|---|---|---|---|---|---|---|
| Mass flow rate | [kg/h] | 1585 | 1540 | 732 | 777 | 638 | 682 |
| Volume flow rate | [m$^3$/h] | 83.9 | 82.3 | 365.8 | 399.8 | 0.685 | 0.766 |
| Temperature | [° C.] | 8 | 8 | 20 | 27.96098 | 8 | 57 |
| Pressure | [bar(g)] | 15 | 15 | 0.1 | 0.1 | 15 | 0.1 |
| CH4 | [kg/h] | 557.5 | 555.0 | 2.1 | 4.6 | 0.00 | 2.51 |
| CO2 | [kg/h] | 1022.0 | 985.4 | 730.0 | 766.7 | 0.09 | 36.76 |
| DMS | [kg/h] | 0.04 | 0.00 | 0.00 | 0.03 | 0.00 | 0.03 |
| Acetone | [kg/h] | 0.34 | 0.00 | 0.00 | 0.34 | 0.00 | 0.34 |
| 2-Butanone | [kg/h] | 0.42 | 0.00 | 0.00 | 0.42 | 0.00 | 0.42 |
| Terpenes | [kg/h] | 3.95 | 0.05 | 0.00 | 3.89 | 37.55 | 41.45 |
| H2O | [kg/h] | 0.69 | 0.00 | 0.00 | 0.69 | 0.00 | 0.68 |
| PEG | [kg/h] | 0.00 | 0.00 | 0.00 | 0.00 | 600.00 | 600.00 |

TABLE 5

|  |  | B62 | BG3 | RG1 | RG5 | AB1 | AB5 |
|---|---|---|---|---|---|---|---|
| Mass flow rate | [kg/h] | 1585 | 1542 | 732 | 775 | 646 | 689 |
| Volume flow rate | [m$^3$/h] | 83.9 | 82.5 | 365.8 | 433.7 | 0.612 | 0.689 |
| Temperature | [° C.] | 8 | 8 | 20 | 55 | 8 | 57 |
| Pressure | [bar(g)] | 15 | 15 | 0.1 | 0.1 | 15 | 0.1 |
| CH4 | [kg/h] | 557.5 | 556.3 | 2.1 | 3.3 | 0.00 | 1.17 |
| CO2 | [kg/h] | 1022.0 | 985.3 | 730.0 | 766.7 | 0.14 | 36.86 |
| DMS | [kg/h] | 0.04 | 0.00 | 0.00 | 0.03 | 0.00 | 0.03 |
| Acetone | [kg/h] | 0.34 | 0.00 | 0.00 | 0.34 | 0.00 | 0.34 |
| 2-Butanone | [kg/h] | 0.42 | 0.00 | 0.00 | 0.42 | 0.03 | 0.45 |
| Terpenes | [kg/h] | 3.95 | 0.07 | 0.00 | 3.88 | 45.31 | 49.20 |
| H2O | [kg/h] | 0.69 | 0.01 | 0.00 | 0.69 | 0.24 | 1.17 |
| PEG | [kg/h] | 0.00 | 0.00 | 0.00 | 0.00 | 600.00 | 600.00 |

TABLE 6

|  |  | BG2 | BG3 | RG1 | RG5 | AB1 | AB5 |
|---|---|---|---|---|---|---|---|
| Mass flow rate | [kg/h] | 15.85 | 1542 | 732 | 775 | 848 | 890 |
| Volume flow rate | [m$^3$/h] | 83.9 | 82.5 | 365.8 | 387.3 | 0.803 | 0.856 |
| Temperature | [° C.] | 8 | 00 | 20 | 20 | 8 | 22 |
| Pressure | [bar(g)] | 15 | 15 | 0.1 | 0.1 | 15 | 0.1 |
| CH4 | [kg/h] | 557.5 | 556.3 | 2.1 | 3.3 | 0.00 | 1.17 |
| CO2 | [kg/h] | 1022.0 | 985.4 | 730.0 | 766.6 | 0.22 | 36.86 |
| DMS | [kg/h] | 0.04 | 0.00 | 0.00 | 0.03 | 0.00 | 0.04 |
| Acetone | [kg/h] | 0.34 | 0.01 | 0.00 | 0.33 | 0.04 | 0.37 |

TABLE 6-continued

|  |  | BG2 | BG3 | RG1 | RG5 | AB1 | AB5 |
|---|---|---|---|---|---|---|---|
| 2-Butanone | [kg/h] | 0.42 | 0.02 | 0.00 | 0.40 | 0.26 | 0.66 |
| Terpenes | [kg/h] | 3.95 | 0.35 | 0.00 | 3.60 | 245.54 | 249.14 |
| H2O | [kg/h] | 0.69 | 0.05 | 0.00 | 0.64 | 1.52 | 2.15 |
| PEG | [kg/h] | 0.00 | 0.00 | 0.00 | 0.02 | 600.00 | 600.00 |

TABLE 7

|  |  | BG2 | BG3 | RG1 | RG5 | AB1 | AB5 |
|---|---|---|---|---|---|---|---|
| Mass flow rate | [kg/h] | 1585 | 1542 | 732 | 776 | 638 | 681 |
| Volume flow rate | [m³/h] | 83.9 | 82.4 | 403.3 | 433.9 | 0.604 | 0.681 |
| Temperature | [° C.] | 8 | 8 | 50 | 55 | 8 | 57 |
| Pressure | [bar(g)] | 15 | 15 | 0.1 | 0.1 | 15 | 0.1 |
| CH4 | [kg/h] | 557.5 | 556.3 | 2.1 | 3.3 | 0.00 | 1.17 |
| CO2 | [kg/h] | 1022.0 | 985.3 | 730.0 | 766.8 | 0.10 | 36.86 |
| DMS | [kg/h] | 0.04 | 0.00 | 0.00 | 0.03 | 0.00 | 0.03 |
| Acetone | [kg/h] | 0.34 | 0.00 | 0.00 | 0.34 | 0.00 | 0.34 |
| 2-Butanone | [kg/h] | 0.42 | 0.00 | 0.00 | 0,42 | 0.01 | 0.43 |
| Terpenes | [kg/h] | 3.95 | 0.05 | 0.00 | 3.89 | 37.64 | 41.54 |
| H2O | [kg/h] | 0.69 | 0.00 | 0.00 | 0.69 | 0.06 | 0.73 |
| PEG | [kg/h] | 0.00 | 0.00 | 0.00 | 0.37 | 600.00 | 600.00 |

TABLE 8

| Mass flow rate |  | BG2 | BG3 | RG1 | RG5 | AB1 | AB5 |
|---|---|---|---|---|---|---|---|
| Mass flow rate | [kg/h] | 1585 | 1540 | 732 | 777 | 638 | 682 |
| Volume flow rate | [m³/h] | 83.9 | 82.3 | 365.8 | 399.8 | 0.604 | 0.682 |
| Temperature | [° C.] | 8 | 8 | 20 | 28 | 8 | 57 |
| Pressure | [bar(g)] | 15 | 15 | 0.1 | 0.1 | 15 | 0.1 |
| CH4 | [kg/h] | 557.5 | 555.0 | 2.1 | 4.6 | 0.00 | 2.51 |
| CO2 | [kg/h] | 1022.0 | 985.4 | 730.0 | 766.7 | 0.09 | 36.76 |
| DMS | [kg/h] | 0.04 | 0.00 | 0.00 | 0.03 | 0.00 | 0.03 |
| Acetone | [kg/h] | 0.34 | 0.00 | 0.00 | 0.34 | 0.00 | 0.34 |
| 2-Butanone | [kg/h] | 0.42 | 0.00 | 0.00 | 0.42 | 0.00 | 0.42 |
| Terpenes | [kg/h] | 3.95 | 0.05 | 0.00 | 3.89 | 37.55 | 41.45 |
| H2O | [kg/h] | 0.69 | 0.00 | 0.00 | 0.69 | 0.00 | 0.68 |
| PEG | [kg/h] | 0.00 | 0.00 | 0.00 | 0.05 | 600.00 | 600.00 |

In all parameter configurations in the simulation model, it is clear that only about 3.6% by volume of the $CO_2$ present in BG1 is absorbed by the absorbent. It should be noted that, in tables 2 and 6, the concentration of the terpenes in AB1 and AB5 is higher than in tables 1, 3-5 and 7-8. In all parameter configurations, the terpenes were not fully removable from the absorbent (see AB1). It is nevertheless surprisingly possible to largely remove the terpenes present in the methane-containing biogas BG2 therefrom; see BG3.

The invention claimed is:

1. A method of processing methane-containing gas, comprising the steps of:
 a) providing a methane-containing gas mixture comprising 20-60% by volume of $CO_2$ and at least one compound from the group of volatile organic compounds (VOC),
  where the at least one VOC is selected from the group consisting of ketones, sulfur-containing hydrocarbons and terpenes,
  where the VOC concentration in the gas mixture is 10-10 000 ppm;
 b) compressing and cooling the methane-containing gas mixture from step a);
 c) feeding the compressed, cooled methane-containing gas mixture to an absorption apparatus, where the absorption apparatus comprises a liquid, reversibly VOC-absorbing absorbent;
 d) absorbing at least a portion of the VOCs and not more than 5% by volume of the $CO_2$ by means of the absorbent, giving a methane-containing gas mixture having reduced levels of VOCs and $CO_2$, and an absorbent laden with VOCs and $CO_2$;
 e) feeding the absorbent laden with VOCs and $CO_2$ from the absorption apparatus to a desorption apparatus;
 f) feeding the methane-containing gas mixture having reduced levels of VOCs and $CO_2$ from the absorption apparatus to a separation apparatus comprising a membrane, in which the methane-containing gas mixture having reduced levels of VOCs and $CO_2$ is separated into a pressure-reduced, $CO_2$-enriched gas stream and an isobaric, methane-enriched gas stream;
 g) feeding a regeneration gas stream comprising at least a portion of the $CO_2$-enriched gas stream from step f) to the desorption apparatus for regeneration of the absorbent laden with VOCs and $CO_2$ to obtain an offgas stream comprising $CO_2$ and the VOCs and an at least partly regenerated absorbent; and
 h) removing the offgas stream from the desorption apparatus and recycling the at least partly regenerated absorbent from the desorption apparatus into the absorption apparatus.

2. The method as claimed in claim 1, wherein in step h), the offgas stream is fed to a regenerative postcombustion apparatus for oxidation.

3. The method as claimed in claim 1, wherein at least steps c) to h) are effected continuously.

4. The method as claimed in claim 1, wherein, in step c), 2 to 10 liters of absorbent per $Bm^3$ of methane-containing gas mixture from step b) is used in the absorption apparatus.

5. The method as claimed in claim 1, wherein, in step g), 1 to 3 liters of VOC-laden absorbent from step d) is regenerated with 1 $Bm^3$ of $CO_2$-enriched gas from step f) in the desorption apparatus.

6. The method as claimed in claim 1, wherein the VOC-absorbing absorbent has a boiling point of more than 250° C. at 1013.25 mbar and comprises a compound selected from the group consisting of polyethylene glycol (PEG), mineral oil, esters or combinations thereof.

7. The method as claimed in claim 1, wherein the VOC-absorbing absorbent comprises a compound of the formula (I):

$$R_1-O-(CH_2CH_2O)_n-R_2, \qquad I)$$

where n=3 to 11 and $R_1$ and $R_2$ are independently selected linear $C_1$-$C_{10}$ alkyls.

8. The method as claimed in claim 1, wherein the at least one VOC has a vapor pressure of at least 0.1 mbar at 20° C. and/or a boiling point of at most 240° C. at 1013.25 mbar.

9. The method as claimed in claim 1, wherein the at least one VOC is selected from the group consisting of acetone, 2-butanone, 3-methyl-2-butanone, 2-pentanone, 3-pentanone, 3,3-dimethyl-2-butanone, 2-methyl-3-pentanone, 4-methyl-2-pentanone, 3-methyl-2-pentanone, 3-hexanone, 2-hexanone, 5-methyl-3-hexanone, 3-methyl-2-hexanone, 2-heptanone, 4-octanone, 3-octanone, 2-octanone, 2,9-decanedione, α-thujene, α-pinene, camphene, sabinene, β-pinene, myrcene, 3-carene, thujanone, thujopsene, thymol, α-terpinene, β-caryophyllene, 1,4-cineol, eucalyptol, fenchone, γ-terpinene, terpinolene, limonene, tricyclene, linalool, menthone, nopinone, p-menthan-2-one, p-menthan-2-ol, camphor, carvomenthone, 3,3-dimethyl-2-bornanone, carbonyl sulfide, methyl mercaptan, ethyl mercaptan, dimethyl sulfide, carbon disulfide, 2-propanethiol, 2-methyl-2-propanethiol, 1-propanethiol, thiophene, 2-butanethiol, isobutyl mercaptan, methyl allyl sulfide, methyl propyl sulfide, butanethiol, dimethyl disulfide, 2-methylthiophene, 3-methylthiophene, tetrahydrothiophene, 1-pentanethiol, thiophenol, dimethyl trisulfide, diisopropyl disulfide, dimethyl tetrasulfide, methyl propyl disulfide and methyl isopropyl disulfide.

10. The method as claimed in claim 1, wherein the methane-containing gas mixture is compressed in step b) to 6 to 24 bar (g).

11. The method as claimed in claim 1, wherein the methane-containing gas mixture (103) is cooled in step b) to 0° C. to 20° C.

12. The method as claimed in claim 1, wherein the VOC-laden absorbent from step d), before being transported into the desorption apparatus, is heated to 30° C. to 90° C.

13. The method as claimed in claim 1, wherein the at least partially regenerated absorbent from step g), before being recycled into the absorption apparatus is cooled.

14. The method as claimed in claim 1, wherein, in step c), the liquid, reversibly VOC-absorbing absorbent is fed to the absorption apparatus at a volume flow rate of at least 7.8 kg/$Bm^3$ of gas mixture.

* * * * *